(12) United States Patent
Liu et al.

(10) Patent No.: US 12,231,359 B2
(45) Date of Patent: Feb. 18, 2025

(54) METHOD AND DEVICE IN NODES USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 372 days.

(21) Appl. No.: 17/669,391

(22) Filed: Feb. 11, 2022

(65) Prior Publication Data
US 2022/0166574 A1    May 26, 2022

Related U.S. Application Data

(63) Continuation of application No. PCT/CN2020/108145, filed on Aug. 10, 2020.

(30) Foreign Application Priority Data

Aug. 16, 2019   (CN) .......................... 201910759144.8

(51) Int. Cl.
*H04L 5/00*    (2006.01)
*H04L 1/00*    (2006.01)
(Continued)

(52) U.S. Cl.
CPC .......... *H04L 5/0044* (2013.01); *H04L 1/0008* (2013.01); *H04W 72/0453* (2013.01); *H04W 72/1273* (2013.01)

(58) Field of Classification Search
CPC ... H04L 5/0044; H04L 1/0008; H04L 1/0045; H04L 1/0072; H04L 5/0007;
(Continued)

(56) References Cited

U.S. PATENT DOCUMENTS

| 2016/0286495 A1 | 9/2016 | Dinan |
| 2022/0124788 A1* | 4/2022 | Kittichokechai . H04W 72/1263 |

(Continued)

FOREIGN PATENT DOCUMENTS

| CN | 105208664 A | 12/2015 |
| CN | 108289020 A | 7/2018 |
| CN | 110120859 A | 8/2019 |

OTHER PUBLICATIONS

ISR received in application No. PCT/CN2020/108145 dated Nov. 10, 2020.
(Continued)

*Primary Examiner* — Sharmin Chowdhury

(57) ABSTRACT

The present disclosure provides a method and a device in a communication node for wireless communications. A communication node receives first information, and the first information is used to determine a first payload size; monitors a first signaling in a target search space, a payload size of a payload of the first signaling is equal to a target payload size; the target search space is used to determine X payload size(s), the target payload size is equal to one of X payload size(s); when there exists one of the X payload size(s) being not less than the first payload size, the target payload size is equal to a payload size among the X payload size(s) which is closest to and not less than the first payload size. The application improves the performance of control signalings.

20 Claims, 6 Drawing Sheets

(51) Int. Cl.
*H04W 72/0453* (2023.01)
*H04W 72/1273* (2023.01)

(58) Field of Classification Search
CPC .............. H04L 5/0053; H04L 5/0094; H04W 72/0453; H04W 72/1273
See application file for complete search history.

(56) References Cited

U.S. PATENT DOCUMENTS

2022/0167320 A1* 5/2022 Lee ................. H04L 1/1671
2022/0264555 A1* 8/2022 Liu ................. H04W 76/20

OTHER PUBLICATIONS

CN201910759144.8 First Office Action dated.
CN201910759144.8 First Search Report dated.
3GPPTSG RAN NR; Multiplexing and Channel Coding(Release 15) 3GPP TS 38.212 V15.6.0 (Jun. 2019), Jun. 24, 2019 (Jun. 24, 2019).
ERICSSON. "Indication of URLLC Configuration" 3GPP TSG-RAN WG1 Meeting #93 R1-1806017, May 12, 2018 (May 12, 2018).
InterDigital Inc"R1-1905407 Discussion on NR Uu Controlling LTE Sidelink" 3GPP TSG RAN WG1 RL1 Apr. 3, 2019.
Ericsson "R1-1814248 Correctionl 17 of DCI size alignmentl (update of RI-1814209)" 3GPP TSG RAN WG1 RL1 Nov. 16, 2018.
"R1-1907099 On Support of NR Uu Controlling LTE Sidelink Final" 3GPP TSG RAN WG1 RL1 May 3, 2019.
Panasonic R1-1701932 "Discussion on size alignment between SL SPS DCI and DCI format 0" 3GPP TSG RAN WG1 RL1 Feb. 3, 2017.
"R1-1804033 Discussion about number of DCI format size" 3GPP TSG RAN WG1 RL1 Apr. 3, 2018.

* cited by examiner

METHOD AND DEVICE IN NODES USED FOR WIRELESS COMMUNICATION

CROSS REFERENCE TO RELATED APPLICATIONS

This application is the continuation of International Patent Application No. PCT/CN2020/108145, filed on Aug. 10, 2020, which claims the priority benefit of Chinese Patent Application No. 201910759144.8, filed on Aug. 16, 2019, the full disclosure of which is incorporated herein by reference.

BACKGROUND

Technical Field

The present disclosure relates to transmission methods and devices in wireless communication systems, and in particular to a transmission scheme and device of control information in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In response to rapidly growing Vehicle-to-Everything (V2X) service, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary, the technical Study Item (SI) of NR V2X was approved.

SUMMARY

Compared with the existing LTE V2X system, NR V2X has a notable feature in supporting groupcast and unicast as well as Hybrid Automatic Repeat Request (HARQ) function. In addition, similar to LTE V2X, NR V2X also supports network-controlled sidelink transmission (for example, mode 1 of NR V2X or mode 3 of LTE V2X). It is also likely that a new Downlink Control Information (DCI) format will be introduced in NR V2X to support network-controlled sidelink transmission. The design of DCI of NR V2X needs a solution. In other discussions of NR, such as the discussion of URLLC enhancement or MIMO enhancement, it is also possible to introduce a new DCI format. The solution in the present disclosure may also be applied to the DCI design of application scenarios other than NR V2X, and even to the design of Sidelink Control Information (SCI).

In view of the problem in the design of DCI in NR V2X, the present disclosure discloses a solution. It should be noted that the embodiments of a first communication node in the present disclosure and the characteristics of the embodiments may be applied to a second communication node if no conflict is incurred, and vice versa. And the embodiments in the present disclosure and the characteristics in the embodiments can be arbitrarily combined if there is no conflict.

The present disclosure provides a method in a first communication node for wireless communications, comprising:
receiving first information, the first information being used to determine a first payload size, the first payload size being a positive integer; and
monitoring a first signaling in a target search space, a payload size of a payload of the first signaling being equal to a target payload size;
herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, when X is greater than 1, different payload size alignment schemes are adopted according to size relations among the first payload size and the X payload sizes, so that padding bits can be added or bit truncation can be executed in a new DCI format without increasing the complexity of UE, thus improving transmission performance and robustness of the DCI.

In one embodiment, the target payload size being equal to one of the X payload size(s)enables that a payload size of a newly introduced DCI format is aligned with the existing payload size, which reduces the detection complexity of the UE and minimizes the impact on the existing design (or minimizes the impact of the sidelink services on cellular services) to ensure backward compatibility.

According to one aspect of the present disclosure, the above method is characterized in also comprising:
receiving second information;
herein, the target search space is a Common Search Space (CSS), or the target search space is a UE-specific search space (USS); the second information is used to determine whether the target search space is a CSS or a USS.

According to one aspect of the present disclosure, the above method is characterized in that when the target search space is a CSS, X is equal to 1 and the target payload size is equal to a payload size of control information adopting a first control information format, and the control information adopting the first control information format can be used in a CSS to schedule a Physical Downlink Shared Channel (PDSCH).

In one embodiment, by limiting a candidate payload size in a CSS, the transmission of a newly introduced DCI in the CSS can be supported and the initial access and normal operation of the system can be ensured at the same time without increasing the blind detection complexity in the CSS.

According to one aspect of the present disclosure, the above method is characterized in that when the target search space is a USS, the second information is also used to determine Y control information formats, Y being a positive integer greater than 1; the Y control information formats are used to determine the X payload size(s).

According to one aspect of the present disclosure, the above method is characterized in that a first characteristic sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

According to one aspect of the present disclosure, the above method is characterized in that when the target payload size is less than the first payload size, the first bit sequence generates a payload of the first signaling after being truncated M bit(s), M1 bit(s) comprised in the M bit(s) belongs(belong) to a first field in the first bit sequence, the first field is used to indicate frequency-domain resources, M being a positive integer, M1 being a positive integer not greater than M.

According to one aspect of the present disclosure, the above method is characterized in also comprising:

operating a first signal;

herein, the first signaling is detected, the first signaling is used to determine time-frequency resources occupied by the first signal, and the operating action is transmitting, or the operating action is receiving.

The present disclosure provides a method in a second communication node for wireless communications, comprising:

transmitting first information, the first information being used to determine a first payload size, the first payload size being a positive integer; and transmitting a first signaling in a target search space, a payload size of a payload of the first signaling being equal to a target payload size;

herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

According to one aspect of the present disclosure, the above method is characterized in also comprising:

transmitting second information;

herein, the target search space is a CSS, or the target search space is a USS; the second information is used to indicate whether the target search space is a CSS or a USS.

According to one aspect of the present disclosure, the above method is characterized in that when the target search space is a CSS, X is equal to 1 and the target payload size is equal to a payload size of control information adopting a first control information format, and the control information adopting the first control information format can be used in a CSS to schedule a PDSCH.

According to one aspect of the present disclosure, the above method is characterized in that when the target search space is a USS, the second information is also used to indicate Y control information formats, Y being a positive integer greater than 1; the Y control information formats are used to determine the X payload size(s).

According to one aspect of the present disclosure, the above method is characterized in that a first characteristic sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

According to one aspect of the present disclosure, the above method is characterized in that when the target payload size is less than the first payload size, the first bit sequence generates a payload of the first signaling after being truncated M bit(s), M1 bit(s) comprised in the M bit(s) belongs(belong) to a first field in the first bit sequence, the first field is used to indicate frequency-domain resources, M being a positive integer, M1 being a positive integer not greater than M.

According to one aspect of the present disclosure, the above method is characterized in also comprising:

executing a first signal;

herein, the first signaling is used to determine time-frequency resources occupied by the first signal, the executing action is receiving, or the executing action is transmitting.

The present disclosure provides a first communication node device for wireless communications, comprising:

a first receiver, receiving first information, the first information being used to determine a first payload size, the first payload size being a positive integer; and a second receiver, monitoring a first signaling in a target search space, a payload size of a payload of the first signaling being equal to a target payload size;

herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

According to one aspect of the present disclosure, the above first communication node is characterized in also comprising:

a first processor, operating a first signal;

herein, the first signaling is detected, the first signaling is used to determine time-frequency resources occupied by the first signal, and the operating action is transmitting, or the operating action is receiving.

The present disclosure provides a second communication node for wireless communications, comprising:

a first transmitter, transmitting first information, the first information being used to determine a first payload size, the first payload size being a positive integer; and a second transmitter, transmitting a first signaling in a target search space, a payload size of a payload of the first signaling being equal to a target payload size;

herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

According to one aspect of the present disclosure, the above second communication node is characterized in also comprising:

a second processor, executing a first signal;

herein, the first signaling is used to determine time-frequency resources occupied by the first signal, the executing action is receiving, or the executing action is transmitting.

In one embodiment, the method in the present disclosure is advantageous in the following aspects:

the method in the present disclosure ensures that a payload size of a newly introduced DCI format is aligned with the existing payload size, which reduces the detection complexity of the UE and minimizes the impact on the existing design (or minimizes the impact of the sidelink services on cellular services) to ensure backward compatibility.

the method in the present disclosure can ensure that padding bits can be added or bit truncation can be executed in a new DCI format without increasing the complexity of UE, thus improving transmission performance and robustness of the DCI.

the method in the present disclosure, by limiting a candidate payload size in a CSS, the transmission of a newly introduced DCI in the CSS can be supported and the initial access and normal operation of the system can be ensured at the same time without increasing the blind detection complexity in the CSS.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
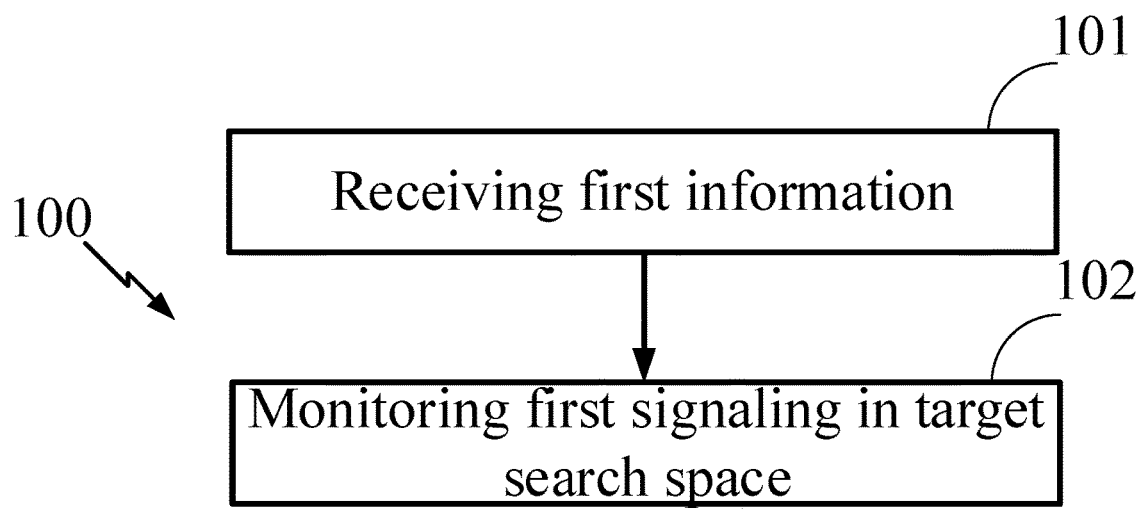
FIG. 1 illustrates a flowchart of first information and a first signaling according to one embodiment of the present disclosure.

Embodiment 1 illustrates a flowchart of first information and a first signaling according to one embodiment of the present disclosure, as shown in FIG. 1. In FIG. 1, each box represents a step. Particularly, the sequential order of steps in these boxes does not necessarily mean that the steps are chronologically arranged.

In embodiment 1, a first communication node in the present disclosure receives first information in step 101, the first information is used to determine a first payload size, and the first payload size is a positive integer; monitors a first signaling in a target search space in step 102, a payload size of a payload of the first signaling is equal to a target payload size; herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, the first information is transmitted through an air interface.

In one embodiment, the first information is transmitted through a radio interface.

In one embodiment, the first information is transmitted through a PC5 interface.

In one embodiment, the first information is transmitted through a Uu interface.

In one embodiment, the first information is transmitted through sidelink.

In one embodiment, the first information is carried by a baseband signal.

In one embodiment, the first information is carried by a Radio Frequency (RF) signal.

In one embodiment, the first information is transferred inside the first communication node.

In one embodiment, the first information comprises higher-layer information, and the first information is transferred from a higher layer of the first communication node to a physical layer of the first communication node.

In one embodiment, the first information is pre-configured.

In one embodiment, the first information comprises all or part of a pre-configured Radio Resource Control (RRC) Information Element (IE).

In one embodiment, the first information comprises physical-layer information.

In one embodiment, the first information comprises dynamic information.

In one embodiment, the first information is semi-persistent information.

In one embodiment, the first information comprises all or partial information in a System Information Block (SIB).

In one embodiment, the first information comprises all or partial information in a Master Information Block (MIB).

In one embodiment, the first information comprises all or part of an RRC signaling.

In one embodiment, the first information is cell specific/cell common.

In one embodiment, the first information is UE specific/dedicated.

In one embodiment, the first information is zone-specific.

In one embodiment, the first information is broadcast.

In one embodiment, the first information is unicast.

In one embodiment, the first information comprises all or partial fields in DCI.

In one embodiment, the first information is transmitted through a Downlink Shared Channel (DL-SCH).

In one embodiment, the first information is transmitted through a Physical Downlink Shared Channel (PDSCH).

In one embodiment, the first information is transmitted through a Sidelink Shared Channel (SL-SCH).

In one embodiment, the first information is transmitted through a Physical Sidelink Shared Channel (PSSCH).

In one embodiment, the first information is transmitted through a Physical Downlink Control Channel (PDCCH).

In one embodiment, the above phrase of "the first information being used to determine a first payload size" includes the following meaning: the first information is used by the first communication node in the present disclosure to determine the first payload size.

In one embodiment, the above phrase of "the first information being used to determine a first payload size" includes the following meaning: the first information is used to directly indicate the first payload size.

In one embodiment, the above phrase of "the first information being used to determine a first payload size" includes the following meaning: the first information is used to indirectly indicate the first payload size.

In one embodiment, the above phrase of "the first information being used to determine a first payload size" includes the following meaning: the first information is used to explicitly indicate the first payload size.

In one embodiment, the above phrase of "the first information being used to determine a first payload size" includes the following meaning: the first information is used to implicitly indicate the first payload size.

In one embodiment, the above phrase of "the first information being used to determine a first payload size" includes the following meaning: the first information indicates a first Bandwidth Part (BWP), and a frequency-domain bandwidth occupied by the first BWP is used to determine the first payload size.

In one embodiment, the above phrase of "the first information being used to determine a first payload size" includes the following meaning: the first information indicates a first BWP, and a number of Physical Resource Blocks (PRBs) occupied by the first BWP is used to determine the first payload size.

In one embodiment, the above phrase of "the first information being used to determine a first payload size" includes the following meaning: the first information indicates a first BWP, a number of PRBs occupied by the first BWP is used to determine the first payload size, and the first BWP is used for sidelink.

In one embodiment, the above phrase of "the first information being used to determine a first payload size" includes the following meaning: the first information indicates a first frequency-domain resource pool, and a number of PRBs occupied by the first frequency-domain resource pool in frequency domain is used to determine the first payload size.

In one embodiment, the above phrase of "the first information being used to determine a first payload size" includes the following meaning: the first information indicates a first candidate delay set, the first candidate delay set comprises at least one candidate delay, and a number of candidate delay (s) comprised in the first candidate delay set is used to determine the first payload size.

In one embodiment, the above phrase of "the first information being used to determine a first payload size" includes the following meaning: the first information indicates whether a second field is carried in the first signaling, and whether the second field is carried in the first signaling is used to determine the first payload size.

In one embodiment, the first payload size is greater than 1.

In one embodiment, the first payload size is not less than 12.

In one embodiment, the first payload size is equal to 12.

In one embodiment, the first payload size is greater than 12.

In one embodiment, the first payload size is a number of information bits comprised in a DCI format.

In one embodiment, the first payload size is a number of information bits comprised in a DCI format adopted by the first signaling.

In one embodiment, the first payload size is a number of information bits comprised in an SCI format.

In one embodiment, the first payload size is a number of information bits comprised in an SCI format adopted by the first signaling.

In one embodiment, the first payload size is a number of information bits comprised in the first signaling.

In one embodiment, the first payload size is a sum of a number of information bits comprised in a DCI format and a number of padding bits.

In one embodiment, the first payload size is a payload size of a DCI payload obtained by adding padding bits in a DCI format comprising less than 12 information bits, and the first payload size is equal to 12.

In one embodiment, the first payload size is a sum of numbers of bits comprised in all fields in the first signaling before truncating or adding padding bits.

In one embodiment, the first payload size is a number of information bits comprised in the first signaling before truncating or adding padding bits.

In one embodiment, the first payload size is a sum of numbers of bits comprised in all fields of a DCI format adopted by the first signaling before truncating or adding padding bits.

In one embodiment, the first bit sequence in the present disclosure is used to generate the first signaling, and the first payload size is equal to a number of bits comprised in the first bit sequence.

In one embodiment, the first payload size is equal to a number of bits comprised in a bit sequence used to generate the first signaling.

In one embodiment, the first payload size is a number of information bits that can be carried by the first signaling determined by the first communication node in the present disclosure itself.

In one embodiment, the target search space is a search space set.

In one embodiment, the target search space is a CSS or a USS.

In one embodiment, the target search space is a Common Search Space Set (CSS Set) or a UE-Specific Search Space Set (USS Set).

In one embodiment, the target search space comprises at least one PDCCH candidate.

In one embodiment, the target search space comprises at least one Physical Sidelink Control Channel (PSCCH) candidate.

In one embodiment, the target search space comprises at least one candidate time-frequency resource set of the first signaling.

In one embodiment, the target search space comprises at least one time-frequency resource set that may be used to transmit the first signaling.

In one embodiment, the target search space comprises at least one candidate of the first signaling being used by the first communication node in the present disclosure to blindly detect the first signaling.

In one embodiment, the target search space comprises a group of at least one time-frequency resource set that may be used to transmit the first signaling and a DCI format that may be adopted by the first signaling.

In one embodiment, the target search space comprises a group of at least one time-frequency resource set that may be used to transmit the first signaling and an SCI format that may be adopted by the first signaling.

In one embodiment, the first signaling is a physical-layer signaling.

In one embodiment, the first signaling is a dynamic signaling.

In one embodiment, the first signaling carries DCI.

In one embodiment, the first signaling carries SCI.

In one embodiment, the first signaling is a PDCCH.

In one embodiment, the first signaling is a PSCCH.

In one embodiment, the first signaling is UE-specific.

In one embodiment, the first signaling is cell-specific.

In one embodiment, the first signaling is a PDCCH scrambled by a UE-Specific Radio Network Temporary Identity (RNTI).

In one embodiment, the first signaling is transmitted through an air interface.

In one embodiment, the first signaling is transmitted through a radio interface.

In one embodiment, the first signaling is transmitted through a PC5 interface.

In one embodiment, the first signaling is transmitted through a Uu interface.

In one embodiment, the first signaling is transmitted through sidelink.

In one embodiment, the first signaling is carried by a baseband signal.

In one embodiment, the first signaling is carried by an RF signal.

In one embodiment, a bit sequence sequentially goes through padding bit insertion, CRC Attachment, Channel Coding, Rate Matching, Scrambling, Modulation, Mapping to Physical Resources and OFDM Baseband Signal Generation to obtain the first signaling.

In one embodiment, a bit sequence sequentially goes through padding bit insertion, CRC Attachment, Channel Coding, Rate Matching, Scrambling, Modulation, Mapping to Physical Resources, Modulation and Upconversion and OFDM Baseband Signal Generation to obtain the first signaling.

In one embodiment, a bit sequence sequentially goes through bit truncation, CRC Attachment, Channel Coding, Rate Matching, Scrambling, Modulation, Mapping to Physical Resources and OFDM Baseband Signal Generation to obtain the first signaling.

In one embodiment, a bit sequence sequentially goes through bit truncation, CRC Attachment, Channel Coding, Rate Matching, Scrambling, Modulation, Mapping to Physical Resources, Modulation and Upconversion and OFDM Baseband Signal Generation to obtain the first signaling.

In one embodiment, a bit sequence sequentially goes through CRC Attachment, Channel Coding, Rate Matching, Scrambling, Modulation, Mapping to Physical Resources and OFDM Baseband Signal Generation to obtain the first signaling.

In one embodiment, a bit sequence sequentially goes through CRC Attachment, Channel Coding, Rate Matching, Scrambling, Modulation, Mapping to Physical Resources, Modulation and Upconversion and OFDM Baseband Signal Generation to obtain the first signaling.

In one embodiment, the above phrase of "monitoring a first signaling in a target search space" includes the following meaning: monitoring the first signaling in the target search space according to a DCI format adopted by the first signaling.

In one embodiment, the above phrase of "monitoring a first signaling in a target search space" includes the following meaning: monitoring the first signaling in the target search space according to an SCI format adopted by the first signaling.

In one embodiment, the above phrase of "monitoring a first signaling in a target search space" includes the following meaning: decoding each PDCCH candidate in the target search space according to a DCI format adopted by the first signaling.

In one embodiment, the above phrase of "monitoring a first signaling in a target search space" includes the following meaning: decoding each PSCCH candidate in the target search space according to an SCI format adopted by the first signaling.

In one embodiment, the above phrase of "monitoring a first signaling in a target search space" includes the following meaning: blindly decoding each PDCCH candidate in the target search space according to a DCI format adopted by the first signaling.

In one embodiment, the above phrase of "monitoring a first signaling in a target search space" includes the following meaning: blindly decoding each PSCCH candidate in the target search space according to an SCI format adopted by the first signaling.

In one embodiment, the above phrase of "monitoring a first signaling in a target search space" includes the following meaning: decoding each PDCCH candidate in the target search space and determining whether there exists a PDCCH candidate in the target search space being used to carry the first signaling through whether a CRC check is passed.

In one embodiment, the above phrase of "monitoring a first signaling in a target search space" includes the following meaning: decoding each PSCCH candidate in the target search space and determining whether there exists a PSCCH candidate in the target search space being used to carry the first signaling through whether a CRC check is passed.

In one embodiment, the above phrase of "monitoring a first signaling in a target search space" includes the following meaning: decoding each PDCCH candidate in the target search space and determining whether there exists a PDCCH candidate in the target search space being used to carry the first signaling through whether a CRC check scrambled by an RNTI is passed.

In one embodiment, the above phrase of "monitoring a first signaling in a target search space" includes the following meaning: decoding each PSCCH candidate in the target search space and determining whether there exists a PSCCH candidate in the target search space being used to carry the first signaling through whether a CRC check scrambled by an RNTI is passed.

In one embodiment, a second bit sequence is used to generate the first signaling through channel coding, a payload of the first signaling is a bit set composed of bits other than a CRC bit in the second bit sequence, and the second bit sequence comprises at least one bit.

In one embodiment, a payload of the firsts signaling is a bit set composed of bits comprised in DCI of the first signaling.

In one embodiment, a payload of the first signaling is a bit set composed of bits other than a CRC bit in bits generated at PHY carried by the first signaling.

In one embodiment, a payload of the first signaling is a bit set composed of bits used to calculate a PHY CRC check bit in the first signaling.

In one embodiment, a payload of the first signaling is an information bit carried by the first signaling, or a payload of the first signaling is a bit after an information bit carried by the first signaling goes through padding bits adding and bit truncation.

In one embodiment, a payload of the first signaling is bits and padding bits (when padding bits exist) in all fields in a DCI format adopted by the first signaling.

In one embodiment, a payload size of a payload of the first signaling refers to a number of bits comprised in a payload of the first signaling.

In one embodiment, a payload size of a payload of the first signaling refers to a bit width of a bit comprised in a payload of the first signaling.

In one embodiment, the target payload size is a positive integer.

In one embodiment, when X is greater than 1, any two of the X payload sizes are not equal.

In one embodiment, when X is greater than 1, there exist two of the X payload sizes being equal.

In one embodiment, any of the X payload sizes is not less than 12.

In one embodiment, any of the X payload sizes is greater than 12.

In one embodiment, there exists one of the X payload sizes being equal to 12.

In one embodiment, any of the X payload sizes is a payload size of a DCI adopting a DCI format.

In one embodiment, there exists one of the X payload size(s) being a payload size of a payload obtained after a DCI format goes through adding padding bits.

In one embodiment, there exists one of the X payload size(s) being a payload size of a payload obtained after a DCI format goes through bit truncation.

In one embodiment, any of the X payload sizes is a payload size of DCI without adding padding bits adopting a DCI format.

In one embodiment, there exists one of the X payload size(s) being equal to a payload size of DCI Format 1-0.

In one embodiment, the X payload size(s) is(are) obtained after through DCI size alignment in the target search space.

In one embodiment, the X payload size(s) is(are) obtained after through DCI size alignment in section 7.3.1.0 of 3GPP TS 38.212 (v15.6.0) in the target search space.

In one embodiment, X is equal to 1, and the X payload size is equal to a payload size of DCI Format 1-0.

In one embodiment, X is equal to 2, and the X payload sizes are respectively equal to payload sizes of DCI Format 1-1 and DCI Format 0-1.

In one embodiment, X is equal to 2, and the X payload sizes are respectively equal to payload sizes of DCI Format 1-0 and DCI Format 2-0.

In one embodiment, X is equal to 2, and the X payload sizes are respectively equal to payload sizes of DCI Format 1-0 and DCI Format 2-1.

In one embodiment, X is equal to 2, and the X payload sizes are respectively equal to payload sizes of DCI Format 1-0 and DCI Format 1-1.

In one embodiment, X is equal to 2, and the X payload sizes are respectively equal to payload sizes of DCI Format 1-0 and DCI Format 0-1.

In one embodiment, X is equal to 2, and the X payload sizes are respectively equal to payload sizes of DCI Format 1-1 and DCI Format 0-1.

In one embodiment, X is equal to 3, and the X payload sizes are respectively equal to payload sizes of DCI Format 1-0, DCI Format 2-0 and DCI Format 2-1.

In one embodiment, X is equal to 3, and the X payload sizes are respectively equal to payload sizes of DCI Format 1-0, DCI Format 0-1 and DCI Format 1-1.

In one embodiment, X is greater than 1.

In one embodiment, X is equal to one of 1, 2, 3, or 4.

In one embodiment, the above phrase of "the target search space being used to determine X payload size(s)" includes the following meaning: the target search space is used by the first communication node in the present disclosure to determine the X payload size(s).

In one embodiment, the above phrase of "the target search space being used to determine X payload size(s)" includes the following meaning: a type of the target search space is used to determine the X payload size(s).

In one embodiment, the above phrase of "the target search space being used to determine X payload size(s)" includes the following meaning: whether the target search space is a CSS or a USS is used to determine the X payload size(s).

In one embodiment, the above phrase of "the target search space being used to determine X payload size(s)" includes the following meaning: the X payload size(s) is(are) related to whether the target search space is a CSS or a USS.

In one embodiment, the above phrase of "the target search space being used to determine X payload size(s)" includes the following meaning: any of the X payload size(s) is a payload size in a target payload size set, the target search space is used to determine the X payload size(s) out of the target payload size set, and the target payload size set is configurable, or the target payload size set is pre-defined.

In one embodiment, the above phrase of "the target search space being used to determine X payload size(s)" includes the following meaning: when the target search space is a CSS and X is equal to 1, the X payload size(s) is(are) equal to a payload size of DCI Format 1-0; when the target search space is a CSS and X is equal to 2, the X payload sizes are respectively equal to payload sizes of DCI Format 1-0 and DCI Format 2-0, or the X payload sizes are respectively equal to payload sizes of DCI Format 1-0 and DCI Format 2-1; when the target search space is a CSS and X is equal to 3, and the X payload sizes are respectively equal to payload sizes of DCI Format 1-0, DCI Format 2-0 and DCI Format 2-1; when the target search space is a USS and X is equal to 1, the X payload size is equal to a payload size of DCI Format 1-0; when the target search space is a USS and X is equal to 2, the X payload sizes are respectively equal to payload sizes of DCI Format 1-0 and DCI Format 1-1, or the X payload sizes are respectively equal to payload sizes of DCI Format 1-0 and DCI Format 0-1, or the X payload sizes are respectively equal to payload sizes of DCI Format 1-1 and DCI Format 0-1; when the target search space is a USS and X is equal to 3, the X payload sizes are respectively equal to payload sizes of DCI Format 1-0, DCI Format 0-1 and DCI Format 1-1.

In one embodiment, the above phrase of "the target search space being used to determine X payload size(s)" includes the following meaning: when the target search space is a CSS or USS, the target search space determines the X payload size(s) according to DCI size alignment in section 7.3.1.0 in 3GPP TS 38.212 (v15.6.0).

In one embodiment, the above phrase of "when X is greater than 1 and there exists one of the X payload sizes being not less than the first payload size, the target payload size being equal to a payload size not less than the first payload size with a minimum difference value between the first payload size among the X payload sizes" includes the following meaning: when X is greater than 1 and there exists one of the X payload sizes being equal to the first payload size, the target payload size is equal to the first payload size; when X is greater than 1 and any of the X payload sizes is not less than the first payload size and there exists one of the X payload sizes being greater than the first payload size, the target payload size is equal to a payload size greater than the first payload size with a minimum difference value between the first payload size among the X payload sizes.

In one embodiment, the above phrase of "when X is greater than 1 and there exists one of the X payload sizes being not less than the first payload size, the target payload size being equal to a payload size not less than the first payload size with a smallest difference value with the first payload size among the X payload sizes" includes the following meaning: when X is greater than 1 and there exists one of the X payload sizes being equal to the first payload size, the target payload size is equal to the first payload size; when X is greater than 1 and any of the X payload sizes is not less than the first payload size and there exists one of the X payload sizes being greater than the first payload size, the target payload size is greater than the first payload size, and the target payload size is equal to a minimum payload size greater than the first payload size among the X payload sizes.

In one embodiment, the above phrase of "when X is greater than 1 and there exists one of the X payload sizes being not less than the first payload size, the target payload size being equal to a payload size not less than the first payload size with a smallest difference value with the first payload size among the X payload sizes" includes the following meaning: when X is greater than 1 and there exists one of the X payload sizes being not less than the first payload size, the target payload size is equal to a payload size among the X payload sizes which is closest to and not less than the first payload size.

In one embodiment, when there exists one of the X payload size(s) being equal to the first payload size, the target payload size is equal to the first payload size.

In one embodiment, the above phrase of "when X is greater than 1 and there exists one of the X payload sizes being not less than the first payload size, the target payload size being equal to a payload size not less than the first payload size with a minimum difference value with the first payload size among the X payload sizes" includes the following meaning: when X is greater than 1 and there exists one of the X payload sizes being not less than the first payload size, each of X1 payload size(s) is a payload size not less than the first payload size among the X payload sizes, X1 is a positive integer not greater than X, and the target payload size is equal to a minimum payload size among the X1 payload size(s).

Embodiment 2

Figure 2:
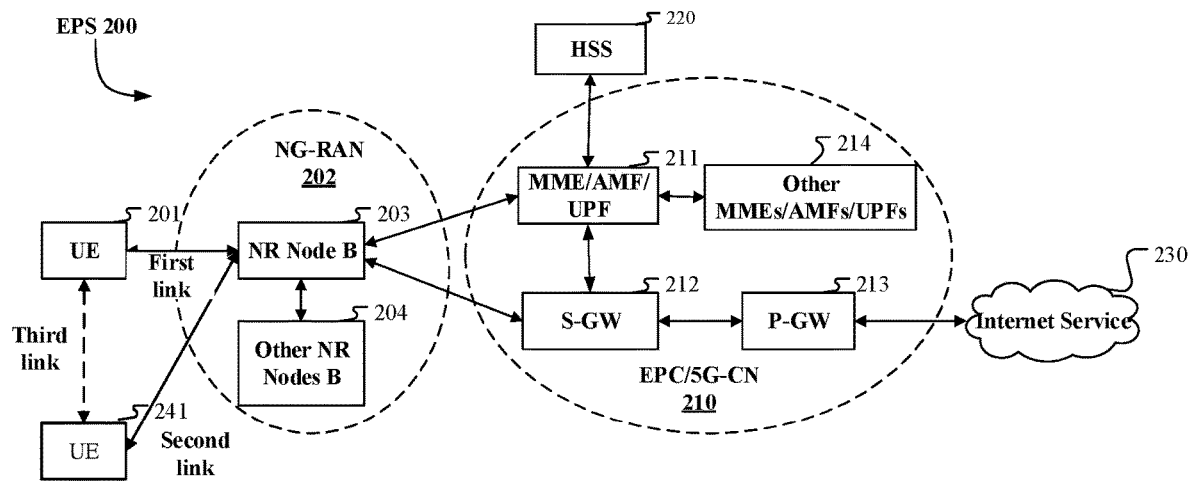
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, the gNB 203 may be a base station, a terrestrial base station relayed via a satellites or a Road Side Unit(RSU) and etc. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, communication units in vehicles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first communication node in the present disclosure.

In one embodiment, the UE 201 supports transmission in sidelink.

In one embodiment, the UE 201 supports a PC5 interface.

In one embodiment, the UE 201 supports Internet of Vehicles.

In one embodiment, the UE 201 supports V2X services.

In one embodiment, the UE 201 supports a new DCI format introduced after the R15 version.

In one embodiment, the gNB 203 corresponds to the second communication node in the present disclosure.

In one embodiment, the gNB 203 supports transmission in sidelink.

In one embodiment, the gNB 203 supports a PC5 interface.

In one embodiment, the gNB 203 supports Internet of Vehicles.

In one embodiment, the gNB 203 supports V2X services.

In one embodiment, the gNB 203 supports a new DCI format introduced after the R15 version.

Embodiment 3

Figure 3:
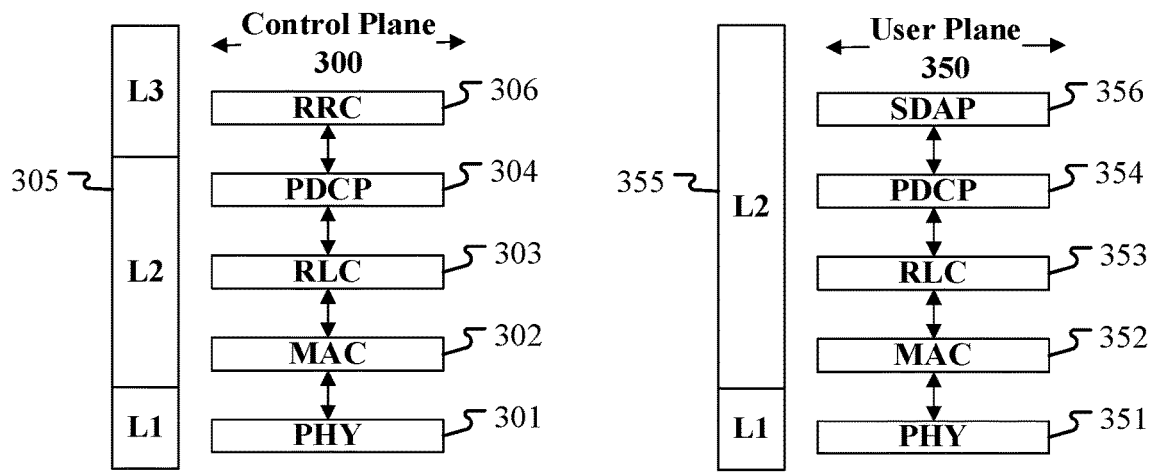
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or vehicle equipment or vehicle-mounted communication modules in V2X) and a second communication node (gNB, UE or vehicle equipment or vehicle-mounted communication modules in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first communication node in the present disclosure.

In one embodiment, the radio protocol architecture in FIG. 3 is applicable to the second communication node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the second information in the present disclosure is generated by the RRC 306.

In one embodiment, the second information in the present disclosure is generated by the MAC 302 or the MAC 352.

In one embodiment, the second information in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

Embodiment 4

Figure 4:
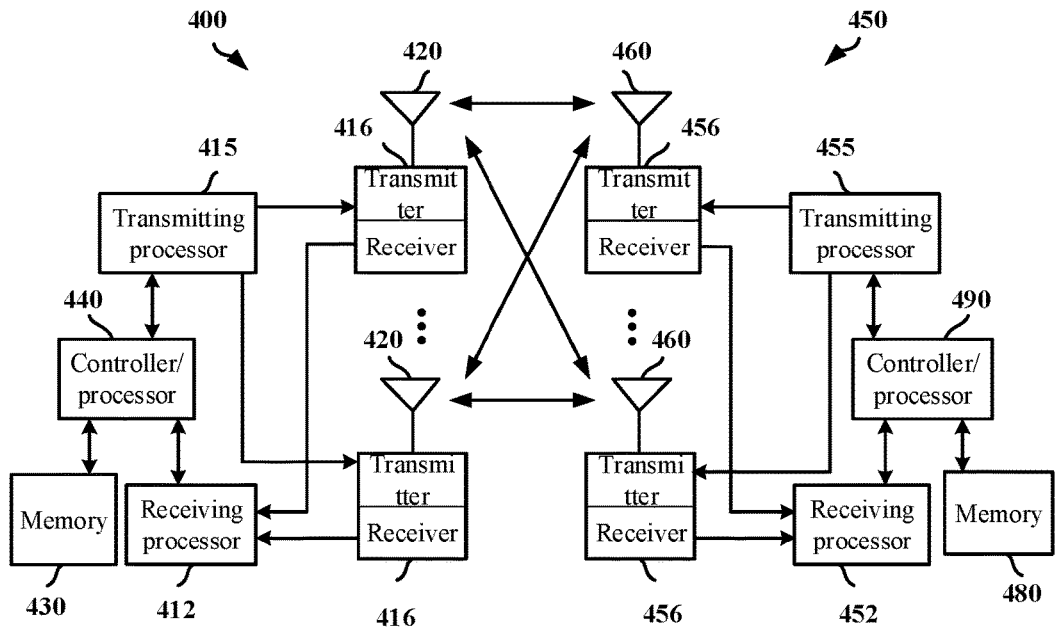
FIG. 4 illustrates a schematic diagram of a first communication node and a second communication node according to one embodiment of the present disclosure.

Embodiment 4 illustrates a schematic diagram of a first communication node and a second communication node in the present disclosure, as shown in FIG. 4.

The first communication node (450) may comprise a controller/processor 490, a data source/buffer 480, a receiving processor 452, a transmitter/receiver 456 and a transmitting processor 455, wherein the transmitter/receiver 456 comprises an antenna 460. The data source/buffer 480 provides a higher-layer packet to the controller/processor 490, the controller/processor 490 provides header compression and decompression, encryption and decryption, packet segmentation and reordering and multiplexing and demultiplexing between a logical channel and a transport channel so as to implement the L2 layer and above layer protocols used for the user plane and the control plane. The higher layer packet may comprise data or control information, such as DL-SCH, UL-SCH or SL-SCH. The transmitting processor 455 performs various signal transmitting processing functions used for the L1 layer (that is, PHY), including coding, interleaving, scrambling, modulation, power control/allocation and generation of physical layer control signaling. the receiving processor 452 performs various signal receiving processing functions used for the L1 layer (that is, PHY), including decoding, deinterleaving, descrambling, demodulation, deprecoding and extraction of physical layer control signaling. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The second communication node (410) may comprise a controller/processor 440, a data source/buffer 430, a receiving processor 412, a transmitter/receiver 416 and a transmitting processor 415, wherein the transmitter/receiver 416 comprises an antenna 420. The data source/buffer 430 provides a higher layer packet to the controller/processor 440, the controller/processor 440 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH or SL-SCH. The transmitting processor 415 provides various signal transmitting processing functions used for the L1 layer (that is, PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, deinterleaving, descrambling, demodulation, deprecoding and extraction of physical layer signaling. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink (DL), a higher-layer packet, such as high-layer information comprised in the first information, the second information, the first signaling (if higher-layer information is comprised in the first signaling) and the first signal (when the first signal is transmitted from the second communication node to the first communication node) in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first communication node 450 based on varied priorities. The controller/processor 440 is also in charge of HARQ operation, retransmission of a lost packet, and a signaling to the first communication node 450, for instance, the first information, the second information, the first signaling (if higher-layer information is comprised in the first signaling) and the first signal (when the first signal is transmitted from the second communication node to the first communication node) in the present disclosure are all generated in the controller/processor 440. The transmitting processor 415 implements various signal processing functions on the L1 layer (i.e., physical layer), including coding, interleaving, scrambling, modulation, power control/distribution, precoding, and generation of a physical-layer control signaling, etc. The generation of physical-layer signals of the first information, the second information, the first signaling and the first signal in the present disclosure are completed by the transmitting processor 415, and the transmitting processor 415 divides the generated modulation symbols into parallel streams and maps each stream to a corresponding multi-carrier subcarrier and/or a multi-carrier symbol, which are then transmitted in the form of a radio-frequency signal by the transmitting processor 415 mapping to the antenna 420 via the transmitter 416. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals carrying the first information, the second information, the first signaling (if the higher-layer information is comprised in the first signaling) and the first signal (when the first signal is transmitted from the second communication node to the first communication node) in the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second communication node 410 on a physical channel, and the data or control signals are later provided to the controller/processor 490. The controller/processor 490 is responsible for the L2 layer and above layers. The controller/processor 490 interprets the first information, the second information, the first signaling (if higher layer information is comprised in the first signaling) and the first signal (when the first signal is transmitted from the second communication node to the first communication node). The controller/processor can be connected to a memory 480 that stores program code and data. The memory 480 may be called a computer readable medium.

In UL transmission, the data source/memory 480 provides higher-layer data to the controller/processor 490. The data source/buffer 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second communication node 410. The controller/processor 490 is also in charge of HARQ operation, retransmission of a lost packet, and a signaling to the second communication node 410. The first signal in the present disclosure (when the first signal is transmitted from the first communication node to the second communication node) is generated at the data source/buffer 480 or at the controller/processor 490. The transmitting processor 455 provides various signal transmitting processing functions for the L1 layer (that is, PHY). The generation of a physical layer signal carrying the first signal in the present disclosure is completed in the transmitting processor 415. The signal transmission processing functions include coding and interleaving so as to facilitate Forward Error Correction (FEC) at the UE 450 as well as modulation of baseband signals based on various modulation schemes (i.e., BPSK, QPSK). The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing a physical layer signal carrying the first signal, the signal receiving and processing function includes acquisition of multi-carrier symbol streams, demodulation based on each modulation scheme (i.e., BPSK, QPSK), then the decoding and de-interleaving to recover data and/or control signals originally transmitted by the first communication node 450 on the PHY. The data and the control signal are then provided to the controller/processor 440. The controller/processor 440 performs functions of L2 layer, including interpreting information carried by the first signal in the present disclosure. The controller/processor can be connected to a buffer 430 that stores program code and data. The buffer 430 may be called a computer readable medium.

When the sidelink transmission is performed, it is similar to the uplink transmission described above.

In one embodiment, the first communication node 450 comprises at least one processor and at least one memory. The at least one memory comprises computer program codes; the at least one memory and the computer program codes are configured to be used in collaboration with the at least one processor, the first communication node 450 at least: receives first information, the first information is used to determine a first payload size, the first payload size is a positive integer; and monitors a first signaling in a target search space, a payload size of a payload of the first signaling is equal to a target payload size; herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, the first communication node 450 comprises a memory that stores a computer readable instruction program. The computer readable instruction program generates an action when executed by at least one processor. The action includes: receiving first information, the first information being used to determine a first payload size, the first payload size being a positive integer; and monitoring a first signaling in a target search space, a payload size of a payload of the first signaling being equal to a target payload size; herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, the second communication node 410 comprises at least one processor and at least one memory. The at least one memory comprises computer program codes; the at least one memory and the computer program codes are configured to be used in collaboration with the at least one processor. The second communication node 410 at least: transmits first information, the first information is used to determine a first payload size, the first payload size is a positive integer; and transmits a first signaling in a target search space, a payload size of a payload of the first signaling is equal to a target payload size; herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, the second communication node 410 comprises a memory that stores a computer readable instruction program. The computer readable instruction program generates an action when executed by at least one processor. The action includes: transmitting first information, the first information being used to determine a first payload size, the first payload size being a positive integer; and transmitting a first signaling in a target search space, a payload size of a payload of the first signaling being equal to a target payload size; herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, the first communication node 450 is a UE.

In one embodiment, the first communication node 450 is a UE that supports V2X.

In one embodiment, the first communication node 450 is a UE that supports a DCI format introduced after R15.

In one embodiment, the first communication node 450 is a vehicle equipment.

In one embodiment, the second communication node 410 is a base station (gNB/eNB).

In one embodiment, the second communication node 410 is a base station that supports V2X.

In one embodiment, the second communication node device 410 is a base station that supports a DCI format introduced after 15.

In one embodiment, the second communication node 410 is a Road Side Unit (RSU).

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to monitor the first signaling in the target search space in the present disclosure.

In one embodiment, the receiver 456 (including the antenna 460) and the receiving processor 452 are used to monitor the first signaling in the target search space in the present disclosure.

In one embodiment, the receiver 456 (including the antenna 460), the receiving processor 452 and the controller/processor 490 are used to receive the second information in the present disclosure.

In one embodiment, the receiver 456 (including the antenna 460), the receiving processor 452 and the controller/processor 490 are used to receive the first signal in the present disclosure.

In one embodiment, the transmitter 456 (including the antenna 460), the transmitting processor 455 and the controller/processor 490 are to transmit the first signal in the present disclosure.

In one embodiment, the transmitter 416 (including the antenna 420), the transmitting processor 415 and the controller/processor 440 are used to transmit the first information in the present disclosure.

In one embodiment, the transmitter 416 (including the antenna 420), the transmitting processor 415 and the controller/processor 440 are used to transmit the first signaling in the present disclosure.

In one embodiment, the transmitter 416 (including the antenna 420) and the transmitting processor 415 are used to transmit the first signaling in the present disclosure.

In one embodiment, the transmitter 416 (including the antenna 420), the transmitting processor 415 and the controller/processor 440 are used to transmit the second information in the present disclosure.

In one embodiment, the transmitter 416 (including the antenna 420), the transmitting processor 415 and the controller/processor 440 are used to transmit the first signal in the present disclosure.

In one embodiment, the receiver 416 (including the antenna 420), the receiving processor 412 and the controller/processor 440 are used to receive the first signal in the present disclosure.

Embodiment 5

Figure 5:
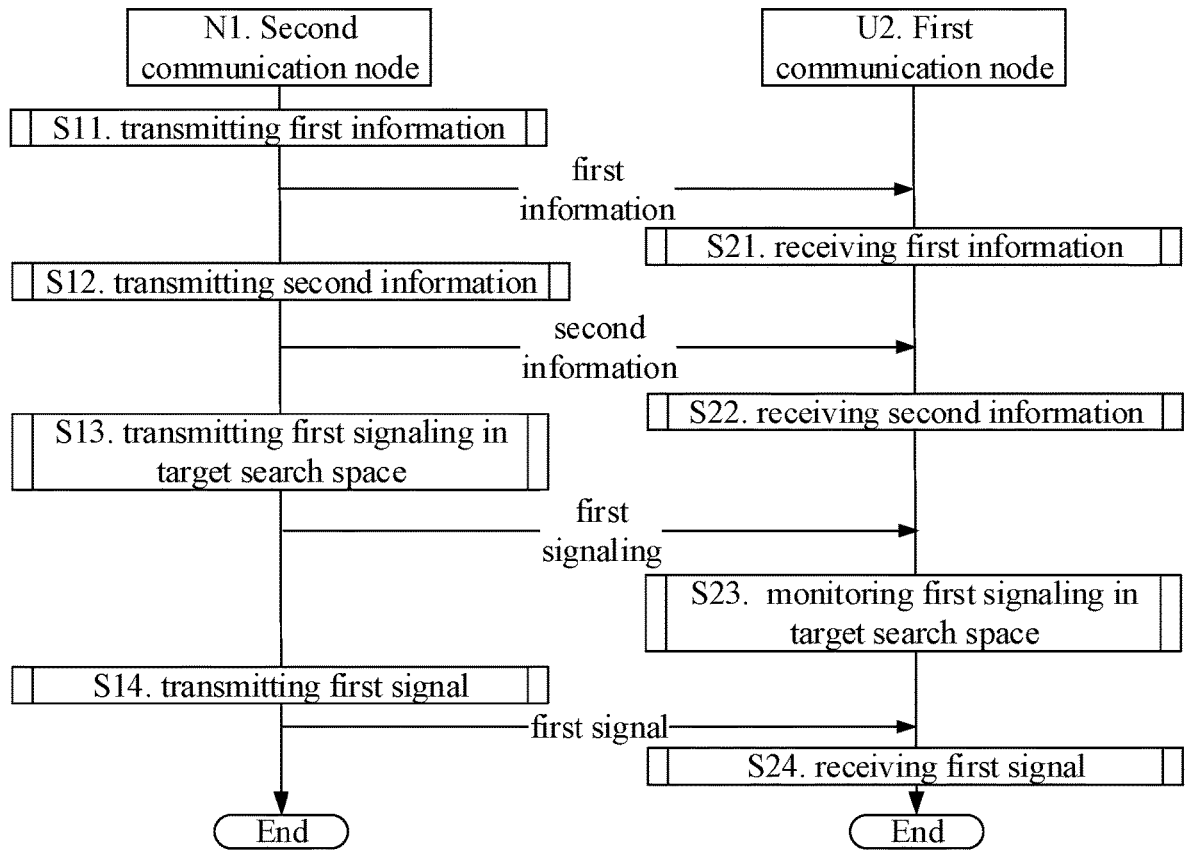
FIG. 5 illustrates a flowchart of radio signal transmission according to one embodiment of the present disclosure.

Embodiment 5 illustrates a flowchart of signal transmission according to one embodiment in the present disclosure, as shown in FIG. 5. In FIG. 5, a second communication node N1 is a maintenance base station of a serving cell of a first communication node U2, particularly, the order in the embodiment does not limit the order of signal transmission and implementation in the present disclosure.

The second communication node N1 transmits first information in step S11, transmits second information in step S12, transmits a first signaling in a target search space in step S13, and transmits a first signal in step S14.

The first communication node U2 receives first information in step S21, receives second information in step S22, monitors a first signaling in a target search space in step S23, and receives a first signal in step S24.

In embodiment 5, the first information is used to determine a first payload size, and the first payload size is a positive integer; a payload size of a payload of the first signaling is equal to a target payload size; the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes; the target search space is a CSS, or the target search space is a USS; the second information is used to determine whether the target search space is a CSS or a USS; the first signaling is used to determine time-frequency resources occupied by the first signal.

In one embodiment, the second information is transmitted through an air interface.

In one embodiment, the second information is transmitted through a radio interface.

In one embodiment, the second information is transmitted through a PC5 interface.

In one embodiment, the second information is transmitted through a Uu interface.

In one embodiment, the second information is transmitted through sidelink.

In one embodiment, the second information is carried by a baseband signal.

In one embodiment, the second information is carried by an RF signal.

In one embodiment, the second information is transferred inside the first communication node.

In one embodiment, the second information comprises higher-layer information, and the second information is transferred from a higher layer of the first communication node to a physical layer of the first communication node.

In one embodiment, the second information is pre-configured.

In one embodiment, the second information comprises all or part of a pre-configured RRC IE.

In one embodiment, the second information comprises physical-layer information.

In one embodiment, the second information comprises dynamic information.

In one embodiment, the second information is semi-persistent information.

In one embodiment, the second information comprises all or partial information in an SIB.

In one embodiment, the second information comprises all or partial information in an MIB.

In one embodiment, the second information comprises all or part of an RRC signaling.

In one embodiment, the second information is cell specific/cell common.

In one embodiment, the second information is UE specific/dedicated.

In one embodiment, the second information is zone-specific.

In one embodiment, the second information is broadcast.

In one embodiment, the second information is unicast.

In one embodiment, the second information comprises all or partial fields of DCI.

In one embodiment, the second information is transmitted through a DL-SCH.

In one embodiment, the second information is transmitted through a PDSCH.

In one embodiment, the second information is transmitted through an SL-SCH.

In one embodiment, the second information is transmitted through a PSSCH.

In one embodiment, the second information is transmitted through a PDCCH.

In one embodiment, the target search space being a CSS refers to: the target search space is a PDCCH CSS.

In one embodiment, the target search space being a CSS refers to: the target search space is a PDCCH CSS set.

In one embodiment, the target search space being a CSS refers to: the target search space is a PSCCH CSS set.

In one embodiment, the target search space being a USS refers to: the target search space is a PDCCH USS.

In one embodiment, the target search space being a USS refers to: the target search space is a PDCCH USS set.

In one embodiment, the target search space being a USS refers to: the target search space is a PSCCH USS.

In one embodiment, the phrase of "the second information being used to determine whether the target search space is a CSS or a USS" includes the following meaning: the second information is used by the first communication node in the present disclosure to determine whether the target search space is a CSS or a USS.

In one embodiment, the phrase of "the second information being used to determine whether the target search space is a CSS or a USS" includes the following meaning: the second information directly indicates whether the target search space is a CSS or a USS.

In one embodiment, the phrase of "the second information being used to determine whether the target search space is a CSS or a USS" includes the following meaning: the second information indirectly indicates whether the target search space is a CSS or a USS.

In one embodiment, the phrase of "the second information being used to determine whether the target search space is a CSS or a USS" includes the following meaning: the second information explicitly indicates whether the target search space is a CSS or a USS.

In one embodiment, the phrase of "the second information being used to determine whether the target search space is a CSS or a USS" includes the following meaning: the second information implicitly indicates whether the target search space is a CSS or a USS.

In one embodiment, the phrase of "the second information being used to determine whether the target search space is a CSS or a USS" includes the following meaning: the second information indicates Q search space set(s), Q being a positive integer, and the target search space is one of the Q search space set(s); the second information indicates whether each of the Q search space set(s) is a CSS or a USS.

In one embodiment, the first signal is a baseband signal.

In one embodiment, the first signal is an RF signal.

In one embodiment, the first signal is transmitted through an air interface.

In one embodiment, the first signal is transmitted through a radio interface.

In one embodiment, the first signal is transmitted through a Uu interface.

In one embodiment, the first signal is transmitted through a DL-SCH.

In one embodiment, the first signal is transmitted through a PDSCH.

In one embodiment, all or part of a Transport Block (TB) is used to generate the first radio signal.

In one embodiment, all or part of a bit block is used to generate the first signal.

In one embodiment, all or part of a characteristic sequence is used to generate the first signal.

In one embodiment, the above phrase of "the first signaling being detected" includes the following meaning: a Cyclic Redundancy Check (CRC) check of the first signaling after channel decoding is passed.

In one embodiment, the above phrase of "the first signaling being detected" includes the following meaning: a CRC check scrambled by a CRC of the first signaling after channel decoding with a characteristic identity of a target receiver of the first signaling is passed.

In one embodiment, the above phrase of "the first signaling being detected" includes the following meaning: a check scrambled by a CRC of the first signaling after channel decoding with an RNTI of the first communication node in the present disclosure is passed.

In one embodiment, the above phrase of "the first signaling being detected" includes the following meaning: a CRC check scrambled by a CRC of the first signaling after channel decoding with an ID of the first communication node in the present disclosure is passed.

In one embodiment, the above phrase of "the first signaling being used to determine time-frequency resources occupied by the first signal" includes the following meanings: the first signaling is used by the first communication node in the present disclosure to determine time-frequency resources occupied by the first signal.

In one embodiment, the above phrase of "the first signaling being used to determine time-frequency resources occupied by the first signal" includes the following meanings: the first signaling is used to directly indicate time-frequency resources occupied by the first signal.

In one embodiment, the above phrase of "the first signaling being used to determine time-frequency resources occupied by the first signal" includes the following meanings: the first signaling is used to indirectly indicate time-frequency resources occupied by the first signal.

In one embodiment, the above phrase of "the first signaling being used to determine time-frequency resources occupied by the first signal" includes the following meanings: the first signaling is used to explicitly indicate time-frequency resources occupied by the first signal.

In one embodiment, the above phrase of "the first signaling being used to determine time-frequency resources occupied by the first signal" includes the following meanings: the first signaling is used to implicitly indicate time-frequency resources occupied by the first signal.

In one embodiment, the above phrase of "the first signaling being used to determine time-frequency resources occupied by the first signal" includes the following meaning: the first signaling is used to indicate a target time-frequency resource pool, and time-frequency resources occupied by the first signal belong to the target time-frequency resource pool.

In one embodiment, the first signaling is also used to determine a Modulation Coding Scheme (MCS) adopted by the first signal.

In one embodiment, the first signaling is also used to determine a Redundancy Version (RV) adopted by the first signal.

In one embodiment, the first signaling is also used to determine a HARQ process to which the first signal belongs.

In one embodiment, the first signaling is also used to determine a characteristic ID of a target receiver of the first signal.

In one embodiment, the first signaling is also used to determine whether the first signal is broadcast, groupcast or unicast.

In one embodiment, the first signaling is also used to determine a Quality of Service (QoS) indicator of the first signal.

In one embodiment, when the operating action in the present disclosure is transmitting, the executing action in the present disclosure is receiving; and when the operating action in the present disclosure is receiving, and the executing action in the present disclosure is transmitting.

Embodiment 6

Figure 6:
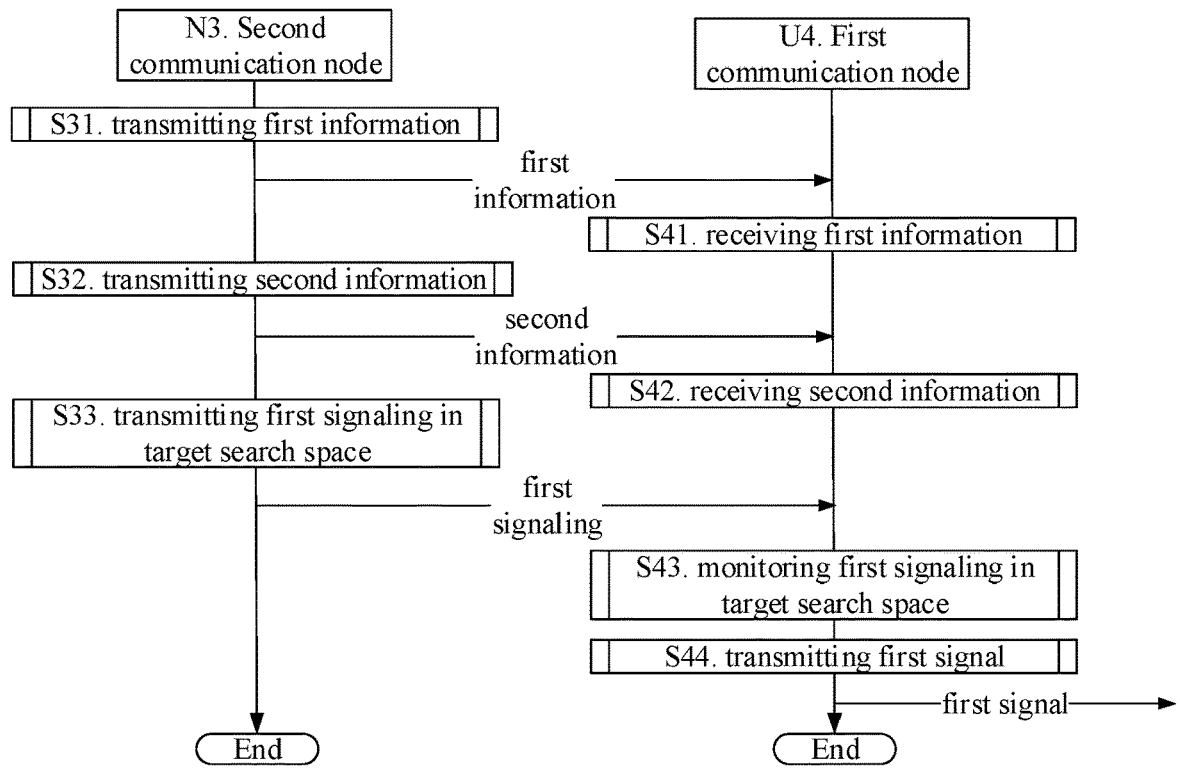
FIG. 6 illustrates a flowchart of radio signal transmission according to another embodiment of the present disclosure.

Embodiment 6 illustrates a flowchart of radio signal transmission according to another embodiment of the present disclosure, as shown in FIG. 6. In FIG. 6, a second communication node N3 is a maintenance base station of a serving cell of a first communication node U4, particularly, the order in the embodiment does not limit the order of signal transmission and implementation in the present disclosure.

The second communication node N3 transmits first information in step S31, transmits second information in step S32, and transmits a first signaling in a target search space in step S33.

The first communication node U4 receives first information in step S41, receives second information in step S42, monitors a first signaling in a target search space in step S43, and transmits a first signal in step S44.

In embodiment 6, the first information is used to determine a first payload size, and the first payload size is a positive integer; a payload size of a payload of the first signaling is equal to a target payload size; the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes; the target search space is a CSS, or the target search space is a USS; the second information is used to determine whether the target search space is a CSS or a USS; the first signaling is used to determine time-frequency resources occupied by the first signal.

In one embodiment, the first signal is transmitted through a PC5 interface.

In one embodiment, the first signal is transmitted through sidelink.

In one embodiment, the first signal is transmitted through an SL-SCH.

In one embodiment, the first signal is transmitted through a PSSCH.

In one embodiment, the first signal is transmitted through a PSCCH.

In one embodiment, the first signal is transmitted through a Physical Sidelink Feedback Channel (PSFCH).

In one embodiment, the first signaling is also used to determine a characteristic ID of a target receiver of the first signal.

In one embodiment, the first signaling is also used to determine whether the first signal is broadcast, groupcast or unicast.

In one embodiment, the first signaling is also used to determine a Quality of Service (QoS) indicator of the first signal.

Embodiment 7

Figure 7:
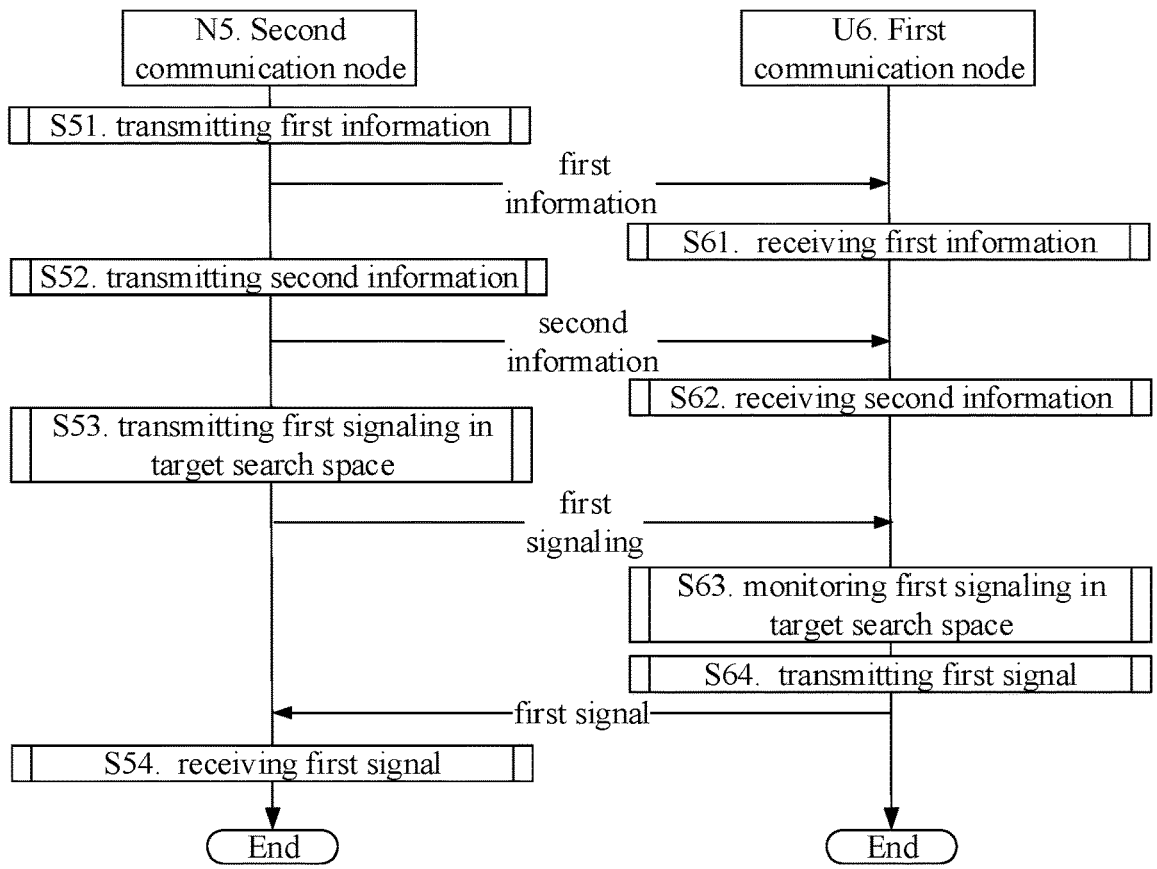
FIG. 7 illustrates a flowchart of radio signal transmission according to another embodiment of the present disclosure.

Embodiment 7 illustrates a flowchart of radio signal transmission according to another embodiment in the present disclosure, as shown in FIG. 7. In FIG. 7, a second communication node N5 is a maintenance base station of a serving cell of a first communication node U6, particularly, the order in the embodiment does not limit the order of signal transmission and implementation in the present disclosure.

The second communication node N5 transmits first information in step S51, transmits second information in step S52, transmits a first signaling in a target search space in step S53, and receives a first signal in step S54.

The first communication node U6 receives first information in step S61, receives second information in step S62, monitors a first signaling in a target search space in step S63, and transmits a first signal in step S64.

In embodiment 7, the first information is used to determine a first payload size, and the first payload size is a positive integer; a payload size of a payload of the first signaling is equal to a target payload size; the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes; the target search space is a CSS, or the target search space is a USS; the second information is used to determine whether the target search space is a CSS or a USS; the first signaling is used to determine time-frequency resources occupied by the first signal.

In one embodiment, the first signal is transmitted through an Uplink Shared Channel (UL-SCH).

In one embodiment, the first signal is transmitted through a Physical Uplink Shared Channel (PUSCH).

Embodiment 8

Figure 8:
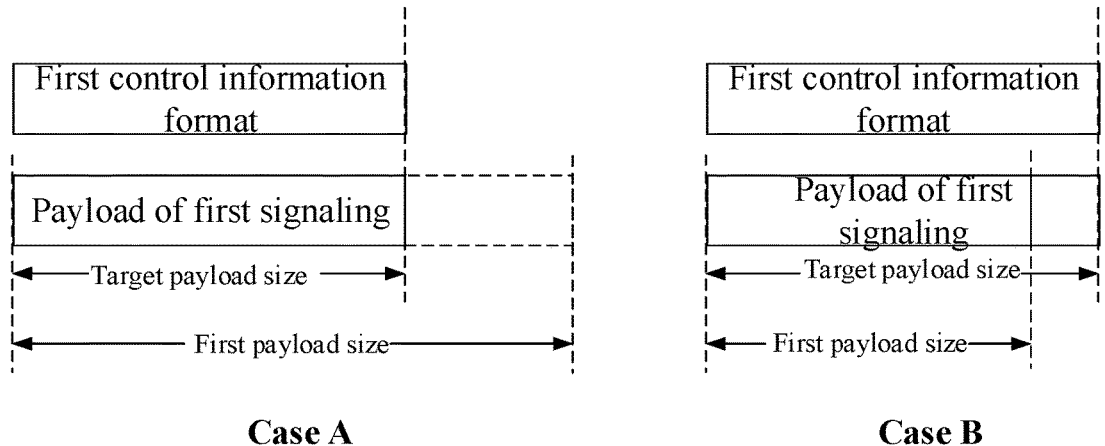
FIG. 8 illustrates a schematic diagram of a relation between a target payload size and a first control information format according to one embodiment of the present disclosure.

Embodiment 8 illustrates a schematic diagram of a relation between a target payload size and a first control information format according to one embodiment of the present disclosure, as shown in FIG. 8. In FIG. 8, in case A, a first payload size is greater than a payload size of control information adopting a first control information format; in case B, a first payload size is greater than a payload size of control information adopting a first control information format.

In embodiment 8, the target search space in the present disclosure is a CSS, or the target search space is a USS; the second information in the present disclosure is used to determine whether the target search space is a CSS or a USS; when the target search space is a CSS, X in the present disclosure is equal to 1 and the target payload size in the present disclosure is equal to a payload size of control information adopting a first control information format, and control information adopting the first control information format can be used to schedule a PDSCH in a CSS.

In one embodiment, the first control information format is DCI format 1-0.

In one embodiment, the first control information format is DCI Format 1-0 in a CSS.

In one embodiment, the first control information format is DCI format 0-0.

In one embodiment, the first control information format is DCI Format 0-0 in a CSS.

In one embodiment, the first control information format is DCI Format 0-0 after through adding padding bits.

In one embodiment, the first control information format is DCI format 0-0 after bit truncation.

In one embodiment, a payload size of control information adopting the first control information format is equal to a payload size of control information adopting DCI Format 1-0 obtained according to Control Resource Set 0 (CORESET0) or an initial downlink bandwidth part.

In one embodiment, the above phrase of "control information adopting the first control information format can be used to schedule a PDSCH in a CSS" includes the following meaning: control information adopting the first control information format comprises scheduling information of a PDSCH, and the control information adopting the first control information format is successfully decoded in a common search space.

In one embodiment, the above phrase of "control information adopting the first control information format can be used to schedule a PDSCH in a CSS" includes the following meaning: control information adopting the first control information format can be used to schedule a PDSCH carrying paging information.

In one embodiment, the above phrase of "control information adopting the first control information format can be used to schedule a PDSCH in a CSS" includes the following meaning: control information adopting the first control information format can be used to schedule a PDSCH carrying Random Access Response (RAR) information.

In one embodiment, the above phrase of "control information adopting the first control information format can be used to schedule a PDSCH in a CSS" includes the following meaning: control information adopting the first control information format can be used to schedule a PDSCH carrying an SIB.

In one embodiment, the PDSCH is unicast.
In one embodiment, the PDSCH is broadcast.
In one embodiment, the PDSCH is groupcast.
In one embodiment, the PDSCH is UE-Specific.
In one embodiment, the PDSCH is cell-specific.
In one embodiment, the PDSCH is UE Group-Specific.

Embodiment 9

Figure 9:
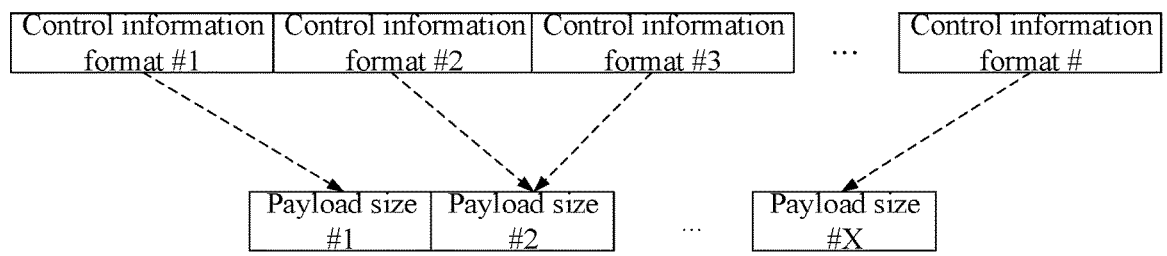
FIG. 9 illustrates a schematic diagram of relations among Y control information formats and X payload size(s) according to one embodiment of the present disclosure.

Embodiment 9 illustrates a schematic diagram of relations among Y control information formats and X payload sizes according to one embodiment of the present disclosure, as shown in FIG. 9. In FIG. 9, each rectangle in the upper row represents one of the Y control information formats, and each rectangle in the lower row represents one of X payload size(s).

In embodiment 9, the target search space in the present disclosure is a CSS, or the target search space is a USS; the second information in the present disclosure is used to determine whether the target search space is a CSS or a USS; when the target search space is a USS, the second information is also used to determine Y control information formats, Y being a positive integer greater than 1; the Y control information formats are used to determine the X payload size(s) in the present disclosure.

In one embodiment, Y is equal to 2.
In one embodiment, Y is equal to 4.
In one embodiment, Y is equal to a positive integer other than 2 or 4.

In one embodiment, any two of the Y control information formats are different.

In one embodiment, Y is equal to 2, and the Y control information formats are DCI format 0-0 and DCI format 1-0 respectively.

In one embodiment, Y is equal to 2, and the Y control information formats are DCI format 0-1 and DCI format 1-1 respectively.

In one embodiment, Y is equal to 2, and the Y control information formats are DCI format 0-0 and DCI format 1-0 respectively, or the Y control information formats are DCI Format 0-1 and DCI Format 1-1 respectively.

In one embodiment, Y is equal to 4, and the Y control information formats are DCI Format 0-0, DCI Format 1-0, DCI Format 0-1 and DCI Format 1-1 respectively.

In one embodiment, Y is not less than X.

In one embodiment, the above phrase of "the second information also being used to determine Y control information formats" includes the following meaning: the second information is used by the first communication node in the present disclosure to determine the Y control information formats.

In one embodiment, the above phrase of "the second information also being used to determine Y control information formats" includes the following meaning: the second information directly indicates the Y control information formats.

In one embodiment, the above phrase of "the second information also being used to determine Y control information formats" includes the following meaning: the second information indirectly indicates the Y control information formats.

In one embodiment, the above phrase of "the second information also being used to determine Y control information formats" includes the following meaning: the second information explicitly indicates the Y control information formats.

In one embodiment, the above phrase of "the second information also being used to determine Y control information formats" includes the following meaning: the second information implicitly indicates the Y control information formats.

In one embodiment, the above phrase of "the second information also being used to determine Y control information formats" includes the following meaning: the second information indicates P USS set(s), P being a positive integer, the second information indicates at least one control information format for each of the P USS set(s), and each control information format indicated for each of the P USS(s) is one of the Y control information formats; the target search space is one of the P USS set(s).

In one embodiment, the above phrase of "the second information also being used to determine Y control information formats" includes the following meaning: the second information indicates P USS set(s), P being a positive integer, the second information indicates at least one control information format for each of the P USS set(s), and a control information format indicated for the P USS(s) consists of the Y control information formats; the target search space is one of the P USS set(s).

In one embodiment, the second information comprises higher layer information "SearchSpace" IE.

In one embodiment, the second information comprises higher layer information "searchSpacesToAddModList" IE.

In one embodiment, the above phrase of "the Y control information formats being used to determine the X payload size(s)" includes the following meaning: the Y control information formats are used by the first communication node in the present disclosure to determine the X payload size(s).

In one embodiment, the above phrase of "the Y control information formats being used to determine the X payload size(s)" includes the following meaning: the Y control information formats are used by the first communication node in the present disclosure to determine the X payload size(s) according to DCI size alignment in section 7.3.1.0 in 3GPP TS 38.212 (v15.6.0).

In one embodiment, the above phrase of "the Y control information formats being used to determine the X payload size(s)" includes the following meaning: the Y control information formats are used by the first communication node in the present disclosure to determine the X payload size(s) according to DCI size alignment.

In one embodiment, the above phrase of "the Y control information formats being used to determine the X payload size(s)" includes the following meaning: the Y control information formats determine the X payload size(s) according to the principle of payload sizes of DCI Format 0-0 and DCI Format 1-0 being equal, payload sizes of DCI Format 0-0 and DCI Format 0-1 being not equal, and payload sizes of DCI Format 1-0 and DCI Format-1 being not equal.

In one embodiment, the above phrase of "the Y control information formats being used to determine the X payload size(s)" includes the following meaning: the Y control information formats determine the X payload size(s) according to the principle of payload size alignment of different control information formats in USS.

In one embodiment, the above phrase of "the Y control information formats being used to determine the X payload size(s)" includes the following meaning: the Y control information formats determine the X payload size(s) according to mapping criteria.

Embodiment 10

Figure 10:
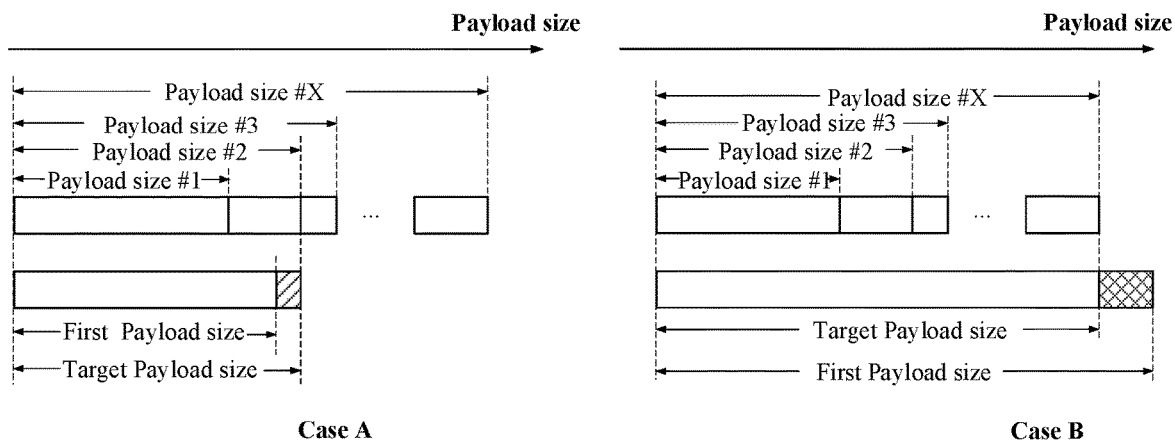
FIG. 10 illustrates a schematic diagram of a relation of a first payload size and a target payload size according to one embodiment of the present disclosure.

Embodiment 10 illustrates a schematic diagram of a relation of a first payload size and a target payload size according to one embodiment of the present disclosure, as shown in FIG. 10. In FIG. 10, the horizontal axis represents a payload size, the rectangle marked by a first payload size represents a first bit sequence, and the rectangle marked by a target payload size represents a payload of a first signaling; in the case A, the target payload size is greater than a first payload size, and the slash-filled rectangle represents padding bits; in the case B, the target payload size is less than a first payload size, and the cross-line filled rectangle represents truncation bits.

In embodiment 10, a first bit sequence is used to generate the first signaling in the present disclosure, and the first payload size in the present disclosure is equal to a number of bits comprised in the first bit sequence; when the target payload size in the present disclosure is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

In one embodiment, the first bit sequence comprises at least one bit.

In one embodiment, the first bit sequence is composed of information bits carried by the first signaling.

In one embodiment, the first bit sequence is obtained by information bits carried by the first signaling through adding padding bits.

In one embodiment, when a number of information bits carried by the first signaling is less than 12, the first bit sequence is obtained by information bits carried by the first signaling through adding padding bits; and when a number of information bits carried by the first signaling is not less than 12, the first bit sequence is composed of information bits carried by the first bit sequence.

In one embodiment, the first bit sequence is obtained by arranging bits in a field in a DCI format adopted by the first signaling.

In one embodiment, the above phrase of "a first bit sequence being used to generate the first signaling" includes the following meaning: the first bit sequence sequentially goes through padding bit insertion, CRC Attachment, Channel Coding, Rate Matching, Scrambling, Modulation, Mapping to Physical Resources and OFDM Baseband Signal Generation to obtain the first signaling.

In one embodiment, the above phrase of "a first bit sequence being used to generate the first signaling" includes the following meaning: the first bit sequence sequentially goes through padding bit insertion, CRC Attachment, Channel Coding, Rate Matching, Scrambling, Modulation, Mapping to Physical Resources, OFDM Baseband Signal Generation and Modulation and Upconversion to obtain the first signaling.

In one embodiment, the above phrase of "a first bit sequence being used to generate the first signaling" includes the following meaning: the first bit sequence sequentially goes through CRC Attachment, Channel Coding, Rate Matching, Scrambling, Modulation, Mapping to Physical Resources and OFDM Baseband Signal Generation to obtain the first signaling.

In one embodiment, the above phrase of "a first bit sequence being used to generate the first signaling" includes the following meaning: the first bit sequence sequentially goes through CRC Attachment, Channel Coding, Rate Matching, Scrambling, Modulation, Mapping to Physical Resources, OFDM Baseband Signal Generation and Modulation and Upconversion to obtain the first signaling.

In one embodiment, the padding bit is '0' bit.

In one embodiment, the adding padding bit is zero-padding.

In one embodiment, the above phrase of "the first bit sequence generating a payload of the first signaling through adding padding bits" includes the following meaning: the first bit sequence directly generates a payload of the first signaling by adding padding bits.

In one embodiment, the above phrase of "the first bit sequence generating a payload of the first signaling through adding padding bits" includes the following meaning: the first bit sequence indirectly generates a payload of the first signaling by adding padding bits.

In one embodiment, each padding bit comprised in a payload of the first signaling is a '0' bit.

In one embodiment, a number of padding bit(s) comprised in a payload of the first signaling is W1, W1 being a positive integer, padding bit(s) comprised in a payload of the first signaling occupy W1 bit(s) of Most Significant Bits (MSB) in a payload of the first signaling.

In one embodiment, a number of padding bit(s) comprised in a payload of the first signaling is W1, W1 being a positive integer, padding bit(s) comprised in a payload of the first signaling occupy W1 bit(s) of Least Significant Bits (LSB) in a payload of the first signaling.

In one embodiment, when a number of padding bits comprised in a payload of the first signaling is greater than 1, padding bits comprised in a payload of the first signaling are discretely distributed in bits comprised in a payload of the first signaling.

In one embodiment, when a number of padding bits comprised in a payload of the first signaling is greater than 1, padding bits comprised in a payload of the first signaling are centrally distributed in bits comprised in a payload of the first signaling.

In one embodiment, the above phrase of "the first bit sequence generating a payload of the first signaling by adding padding bits, and a sum of the first payload size and a number of padding bits comprised in a payload of the first signaling being equal to the target payload size" includes the following meaning: adding padding bits to the first bit sequence until a total number of bits is equal to the target payload size.

In one embodiment, when the target payload size is equal to the first payload size, the first bit sequence is a payload of the first signaling.

In one embodiment, the above phrase of "the first bit sequence generates a payload of the first signaling through bit truncation" includes the following meaning: the first bit sequence directly generates a payload of the first signaling through bit truncation.

In one embodiment, the above phrase of "the first bit sequence generates a payload of the first signaling through bit truncation" includes the following meaning: the first bit sequence indirectly generates a payload of the first signaling through bit truncation.

In one embodiment, truncated bits of the first bit sequence belong to a same field in a same DCI format.

In one embodiment, when the number of truncated bits of the first bit sequence is greater than 1, there exist two truncated bits of the first bit sequence belonging to two different fields in a same DCI format.

In one embodiment, a number of truncated bit(s) of the first bit sequence is equal to W2, W2 is a positive integer, and truncated bit(s) of the first bit sequence is(are) W2 bit(s) of MSB of the first bit sequence.

In one embodiment, a number of truncated bit(s) of the first bit sequence is equal to W2, W2 is a positive integer, and truncated bit(s) of the first bit sequence is(are) W2 bit(s) of LSB of the first bit sequence.

In one embodiment, a number of truncated bit(s) of the first bit sequence is equal to W2, W2 is a positive integer, and truncated bit(s) of the first bit sequence is(are) W2 bit(s) of MSB of a field in a DCI format adopted by the first bit sequence.

In one embodiment, a number of truncated bit(s) of the first bit sequence is equal to W2, W2 is a positive integer, and truncated bit(s) of the first bit sequence is(are) W2 bit(s) of LSB of a field in a DCI format adopted by the first bit sequence.

In one embodiment, when a number of truncated bits of the first bit sequence is greater than 1, the truncated bits of the first bit sequence are discretely distributed in bits comprised in the first bit sequence.

In one embodiment, when a number of truncated bits of the first bit sequence is greater than 1, the truncated bits of the first bit sequence are centrally distributed in bits comprised in the first bit sequence.

In one embodiment, the above phrase of "when the target payload size is less than the first payload size, the first bit sequence generating a payload of the first signaling through bit truncation, and a number of truncated bits of the first bit sequence being equal to a difference value of the first payload size and the target payload size" includes the following meaning: when the target payload size is less than the first payload size, a number of bits obtained by the first bit sequence through bit truncation is equal to the target payload size.

Embodiment 11

Figure 11:
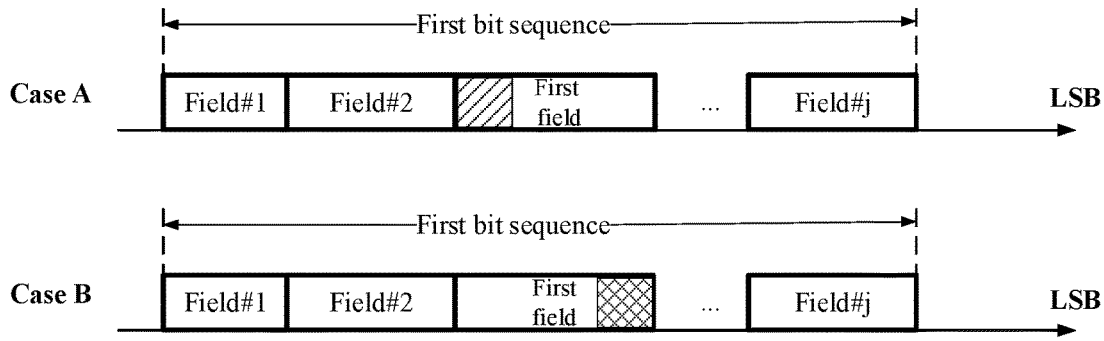
FIG. 11 illustrates a schematic diagram of relation(s) of M1 bit(s) and a first field according to one embodiment of the present disclosure.

Embodiment 11 illustrates a schematic diagram of relation(s) of M1 bit(s) and a first field according to one embodiment of the present disclosure, as shown in FIG. 11. In FIG. 11, each thick-line framed rectangle represents a field in a first bit sequence, and in case A, the slash-filled rectangle represents M1 bit(s); in the case B, the cross-line filled rectangle represents M1 bit(s); in cases A and B, the direction of the arrow represents a direction from high-order bit to low-order bit.

In embodiment 11, when the target payload size in the present disclosure is less than the first payload size in the present disclosure, the first bit sequence in the present disclosure generates a payload of the first signaling in the present disclosure after being truncated M bit(s), M1 bit(s) comprised in the M bit(s) belongs(belong) to a first field in the first bit sequence, the first field is used to indicate frequency-domain resources, M being a positive integer, M1 being a positive integer not greater than M.

In one embodiment, the M1 bit(s) is(are) arranged in the order in the first bit sequence, and the M1 bit(s) is(are) M1 MSB(s) in the first field.

In one embodiment, the M1 bit(s) is(are) arranged in the order in the first bit sequence, and the M1 bit(s) is(are) M1 LSB(s) in the first field.

In one embodiment, the M1 bit(s) is(are) arranged in the order in the first bit sequence, when M1 is greater than 1 and M is greater than M1, the M1 bits are centrally distributed in the M bits.

In one embodiment, the M1 bit(s) is(are) arranged in the order in the first bit sequence, when M1 is greater than 1 and M is greater than M1, the M1 bits are discretely distributed in the M bits.

In one embodiment, M1 is equal to M.

In one embodiment, M1 is less than M.

In one embodiment, M1 is equal to M, and the M1 bit(s) is(are) the M bit(s).

In one embodiment, the first field is a field in a DCI format adopted by an information bit generating the first bit sequence.

In one embodiment, the first field is a field in a DCI format adopted by the first bit sequence.

In one embodiment, the M1 bit(s) is(are) M1 MSB(s) of the first field before bit truncation.

In one embodiment, the M1 bit(s) is(are) M1 LSB(s) of the first field before bit truncation.

In one embodiment, the first field is a "Frequency Domain Resource Assignment" field.

In one embodiment, the above phrase of "the first field being used to indicate frequency-domain resources" includes the following meaning: the first field is used to indicate frequency-domain resources occupied by a PDSCH.

In one embodiment, the above phrase of "the first field being used to indicate frequency-domain resources" includes the following meaning: the first field is used to indicate frequency-domain resources occupied by a PUSCH.

In one embodiment, the above phrase of "the first field being used to indicate frequency-domain resources" includes the following meaning: the first field is used to indicate frequency-domain resources occupied by a PSSCH.

In one embodiment, the above phrase of "the first field being used to indicate frequency-domain resources" includes the following meaning: the first field is used to indicate frequency-domain resources occupied by a PSCCH.

In one embodiment, the above phrase of "the first field being used to indicate frequency-domain resources" includes the following meaning: the first field is used to indicate a frequency-domain resource pool used for sidelink transmission.

In one embodiment, the above phrase of "the first field being used to indicate frequency-domain resources" includes the following meaning: the first field is used to indicate a frequency-domain subchannel occupied by a PSSCH.

In one embodiment, the above phrase of "the first field being used to indicate frequency-domain resources" includes the following meaning: the first field is used to indicate a frequency-domain subchannel occupied by a PSCCH.

In one embodiment, the above phrase of "the first field being used to indicate frequency-domain resources" includes the following meaning: the first field is used by the second communication node in the present disclosure to indicate frequency-domain resources.

In one embodiment, the above phrase of "the first field being used to indicate frequency-domain resources" includes the following meaning: the first field is used by the first communication node in the present disclosure to indicate frequency-domain resources.

In one embodiment, the above phrase of "the first field being used to indicate frequency-domain resources" includes the following meaning: the first field is used to directly indicate frequency-domain resources.

In one embodiment, the above phrase of "the first field being used to indicate frequency-domain resources" includes the following meaning: the first field is used to indirectly indicate frequency-domain resources.

In one embodiment, the above phrase of "the first field being used to indicate frequency-domain resources" includes the following meaning: the first field is used to explicitly indicate frequency-domain resources.

In one embodiment, the above phrase of "the first field being used to indicate frequency-domain resources" includes the following meaning: the first field is used to implicitly indicate frequency-domain resources.

Embodiment 12

Figure 12:
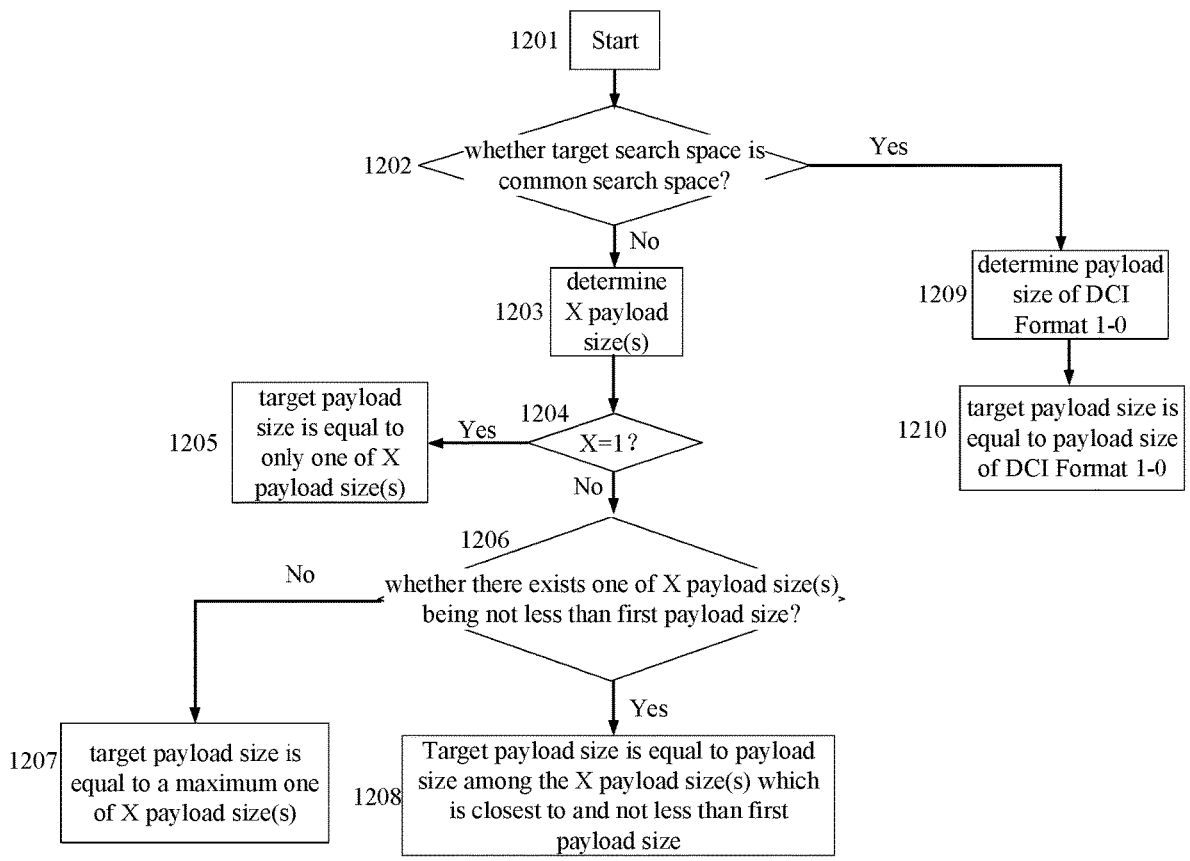
FIG. 12 illustrates a schematic diagram of a process of calculating a target payload size according to one embodiment of the present disclosure.

Embodiment 12 illustrates a schematic diagram of a process of calculating a target payload size according to one embodiment of the present disclosure, as shown in FIG. 12. In FIG. 12, each rectangle represents an operating action, and each diamond represents a judging action. In FIG. 12, start from 1201, judge whether a target search space is a CSS in 1202, determine X payload size(s) in 1203, judge whether X is equal to 1 in 1204, a target payload size is equal to only one of X payload size(s) in 1205, judge whether there exists one of X payload size(s) being not less than a first payload size in 1206, a target payload size is equal to a maximum one of X payload size(s) in 1207, a target payload size is equal to a payload size not less than a first payload size with a minimum difference value between a first payload size among X payload size(s) in 1208, determine a payload size of DCI Format 1-0 in 1209, and a target payload size is equal to a payload size of DCI Format 1-0 in 1210.

In one embodiment, the first control information format is DCI format 1-0.

In one embodiment, the first control information format is DCI Format 1-0 in a CSS.

Embodiment 13

Figure 13:
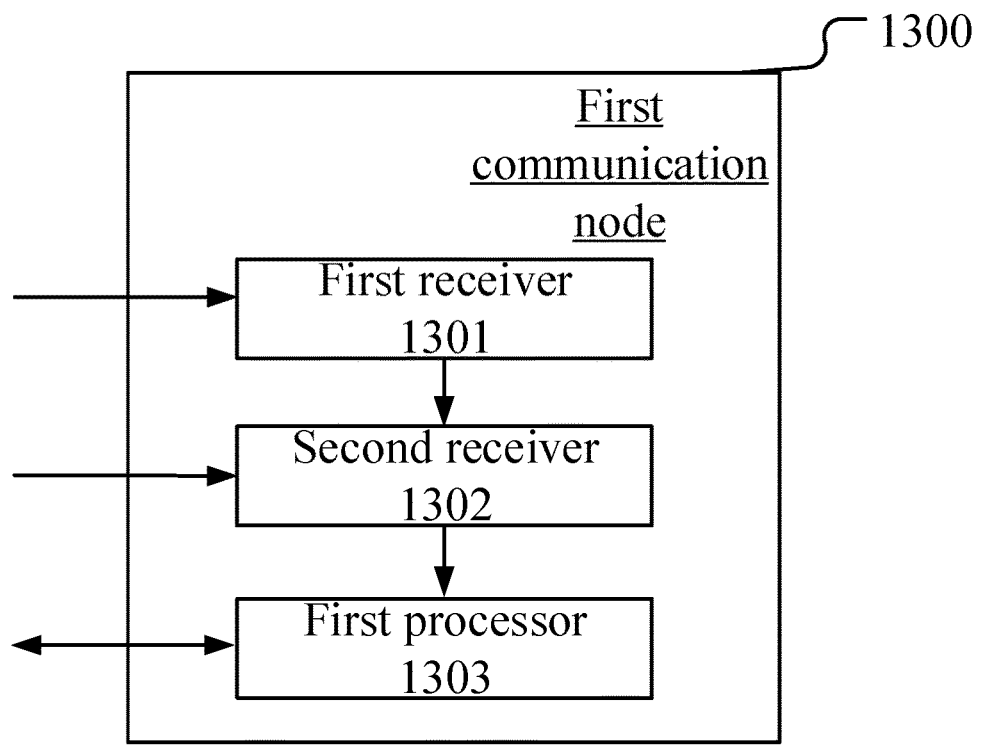
FIG. 13 illustrates a structure block diagram of a processing device in a first communication node according to one embodiment of the present disclosure.

Embodiment 13 illustrates a structure block diagram of a processing device in a first communication node, as shown in FIG. 13. In FIG. 13, a processing device 1300 of the first communication node comprises a first receiver 1301, a second receiver 1302 and a first processor 1303. The first receiver 1301 comprises the transmitter/receiver 456 (including the antenna 460), the receiving processor 452 and the controller/processor 490 in FIG. 4 of the present disclosure; the second receiver 1302 comprises the transmitter/receiver 456 (including the antenna 460), the receiving processor 452 and the controller/processor 490 in FIG. 4 of the present disclosure; and the first processor 1303 comprises the transmitter/receiver 456 (including the antenna 460), the receiver processor 452, the transmitting processor 455 and the controller/processor 490 in FIG. 4 of the present disclosure.

In embodiment 13, the first receiver 1301 receives first information, the first information is used to determine a first payload size, the first payload size is a positive integer; and the second receiver 1302 monitors a first signaling in a target search space, a payload size of a payload of the first signaling is equal to a target payload size; herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, the first receiver 1301 receives second information; herein, the target search space is a CSS, or the target search space is a USS; the second information is used to determine whether the target search space is a CSS or a USS.

In one embodiment, the first receiver 1301 receives second information; herein, the target search space is a CSS, or the target search space is a USS; the second information is used to determine whether the target search space is a CSS or a USS; when the target search space is a CSS, X is equal to 1 and the target payload size is equal to a payload size of control information adopting a first control information format, and the control information adopting the first control information format can be used in a CSS to schedule a PDSCH.

In one embodiment, the first receiver 1301 receives second information; herein, the target search space is a CSS, or the target search space is a USS; the second information is used to determine whether the target search space is a CSS or a USS; when the target search space is a USS, the second information is also used to determine Y control information formats, Y being a positive integer greater than 1; the Y control information formats are used to determine the X payload size(s).

In one embodiment, a first characteristic sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

In one embodiment, a first characteristic sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size; when the target payload size is less than the first payload size, the first bit sequence generates a payload of the first signaling after being truncated M bit(s), M1 bit(s) comprised in the M bit(s) belongs(belong) to a first field in the first bit sequence, the first field is used to indicate frequency-domain resources, M being a positive integer, M1 being a positive integer not greater than M.

In one embodiment, the first processor 1303 operates a first signal; herein, the first signaling is detected, the first signaling is used to determine time-frequency resources occupied by the first signal, and the operating action is transmitting, or the operating action is receiving.

Embodiment 14

Figure 14:
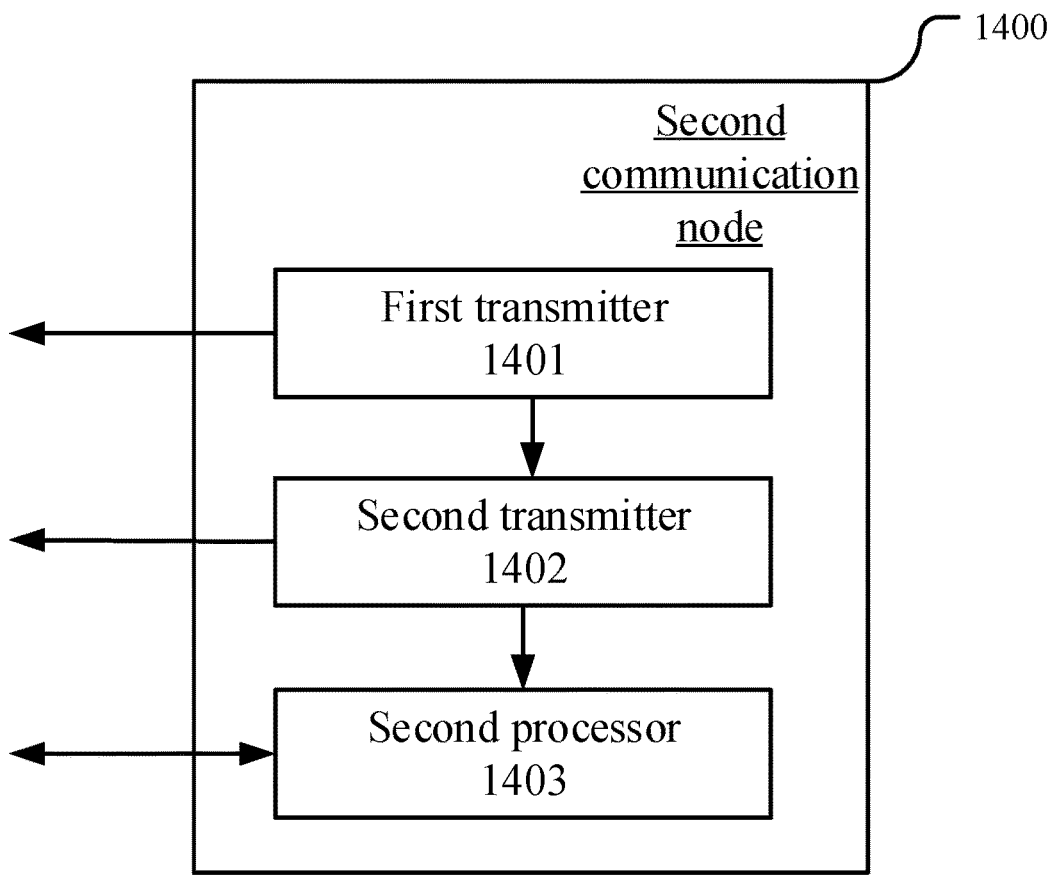
FIG. 14 illustrates a structure block diagram of a processing device in a second communication node according to one embodiment of the present disclosure.

Embodiment 14 illustrates a structure block diagram of a processing device of a second communication node according to one embodiment, as shown in FIG. 14. In FIG. 14, a processing device 1400 of the second communication node comprises a first transmitter 1401, a second transmitter 1402 and a second processor 1403. The first transmitter 1401 comprises the transmitter/receiver 416 (including the antenna 420), the transmitting processor 415 and the controller/processor 440 in FIG. 4 of the present disclosure; the second transmitter 1402 comprises the transmitter/receiver 416 (including the antenna 420), the transmitting processor 415 and the controller/processor 440 in FIG. 4 of the present disclosure; the second processor 1403 comprises the transmitter/receiver 416 (including the antenna 420), the transmitting processing 415, the receiving processor 412 and the controller/processor 440 in FIG. 4 of the present disclosure.

In embodiment 14, the first transmitter 1401 transmits first information, the first information is used to determine a first payload size, the first payload size is a positive integer; and a second transmitter 1402 transmits a first signaling in a target search space, a payload size of a payload of the first signaling is equal to a target payload size; herein, the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

In one embodiment, the first transmitter 1401 transmits second information; herein, the target search space is a CSS, or the target search space is a USS; the second information is used to indicate whether the target search space is a CSS or a USS.

In one embodiment, the first transmitter 1401 transmits second information; herein, the target search space is a CSS, or the target search space is a USS; the second information is used to indicate whether the target search space is a CSS or a USS; when the target search space is a CSS, X is equal to 1 and the target payload size is equal to a payload size of control information adopting a first control information format, and the control information adopting the first control information format can be used in a CSS to schedule a PDSCH.

In one embodiment, the first transmitter 1401 transmits second information; herein, the target search space is a CSS, or the target search space is a USS; the second information is used to indicate whether the target search space is a CSS or a USS; when the target search space is a USS, the second information is also used to indicate Y control information formats, Y being a positive integer greater than 1; the Y control information formats are used to determine the X payload size(s).

In one embodiment, a first characteristic sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

In one embodiment, a first characteristic sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size; when the target payload size is less than the first payload size, the first bit sequence generate a payload of the first signaling after being truncated M bits, M1 bit(s) comprised in the M bit(s) belongs(belong) to a first field in the first bit sequence, the first field is used to indicate frequency-domain resources, M being a positive integer, M1 being a positive integer not greater than M.

In one embodiment, the second processor 1403 executes a first signal; herein, the first signaling is used to determine time-frequency resources occupied by the first signal, the executing action is receiving, or the executing action is transmitting.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first communication node or the second communication node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first communication node for wireless communications, comprising:
    a first receiver, receiving first information, the first information being used to determine a first payload size, the first payload size being a positive integer; and
    a second receiver, monitoring a first signaling in a target search space, wherein a payload size of a payload of the first signaling being equal to a target payload size;
    wherein the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

2. The first communication node according to claim 1, wherein the first receiver receives second information; wherein the target search space is a Common Search Space (CSS), or the target search space is a UE-specific search space (USS); the second information is used to determine whether the target search space is a CSS or a USS.

3. The first communication node according to claim 2, wherein when the target search space is a CSS, X is equal to 1 and the target payload size is equal to a payload size of control information adopting a first control information format, and the control information adopting the first control information format can be used in a CSS to schedule a Physical Downlink Shared Channel (PDSCH).

4. The first communication node according to claim 2, wherein when the target search space is a USS, the second information is also used to determine Y control information formats, Y being a positive integer greater than 1; the Y control information formats are used to determine the X payload size(s).

5. The first communication node according to claim 1, wherein a first bit sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

6. The first communication node according to claim 5, wherein when the target payload size is less than the first payload size, the first bit sequence generates a payload of the first signaling after being truncated M bit(s), M1 bit(s) comprised in the M bit(s) belongs (belong) to a first field in the first bit sequence, the first field is used to indicate frequency-domain resources, M being a positive integer, M1 being a positive integer not greater than M.

7. The first communication node according to claim 1, comprising:
    a first processor, operating a first signal;
    wherein the first signaling is detected, the first signaling is used to determine time-frequency resources occupied by the first signal, and the operating action is transmitting, or the operating action is receiving.

8. A second communication node for wireless communications, comprising:
    a first transmitter, transmitting first information, the first information being used to determine a first payload size, the first payload size being a positive integer; and a second transmitter, transmitting a first signaling in a target search space, wherein a payload size of a payload of the first signaling being equal to a target payload size;

wherein the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

9. The second communication node according to claim 8, wherein the first transmitter transmits second information; wherein the target search space is a CSS, or the target search space is a USS; the second information is used to indicate whether the target search space is a CSS or a USS.

10. The second communication node according to claim 9, wherein when the target search space is a CSS, X is equal to 1 and the target payload size is equal to a payload size of control information adopting control information of a first control information format, and the control information adopting the first control information format can be used in a CSS to schedule a PDSCH; when the target search space is a USS, the second information is also used to indicate Y control information formats, Y being a positive integer greater than 1; the Y control information formats are used to determine the X payload size(s).

11. The second communication node according to claim 8, wherein a first bit sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

12. The second communication node according to claim 11, wherein when the target payload size is less than the first payload size, the first bit sequence generates a payload of the first signaling after being truncated M bit(s), M1 bit(s) comprised in the M bit(s) belongs (belong) to a first field in the first bit sequence, the first field is used to indicate frequency-domain resources, M being a positive integer, M1 being a positive integer not greater than M.

13. The second communication node according to claim 8, comprising:
a second processor, executing a first signal;
wherein the first signaling is used to determine time-frequency resources occupied by the first signal, the executing action is receiving, or the executing action is transmitting.

14. A method in a first communication node for wireless communications, comprising:
receiving first information, the first information being used to determine a first payload size, the first payload size being a positive integer; and monitoring a first signaling in a target search space, wherein a payload size of a payload of the first signaling being equal to a target payload size;

wherein the target search space is used to determine X payload size(s), the target payload size is equal to one of X payload size(s), X is a positive integer, and any of the X payload size(s) is a positive integer; when X is greater than 1 and there exists one of the X payload sizes being not less than the first payload size, the target payload size is equal to a payload size among the X payload sizes which is closest to and not less than the first payload size; when X is greater than 1 and any of the X payload sizes is less than the first payload size, the target payload size is equal to a largest payload size among the X payload sizes.

15. The method in a first communication node according to claim 14, comprising:
receiving second information;
wherein the target search space is a CSS, or the target search space is a USS; the second information is used to determine whether the target search space is a CSS or a USS.

16. The method in a first communication node according to claim 15, wherein when the target search space is a CSS, X is equal to 1 and the target payload size is equal to a payload size of control information adopting a first control information format, and the control information adopting the first control information format can be used in a CSS to schedule a PDSCH.

17. The method in a first communication node according to claim 15, wherein when the target search space is a USS, the second information is also used to determine Y control information formats, Y being a positive integer greater than 1; the Y control information formats are used to determine the X payload size(s).

18. The method in a first communication node according to claim 14, wherein a first bit sequence is used to generate the first signaling, and the first payload size is equal to a number of bits comprised in the first bit sequence; when the target payload size is greater than the first payload size, the first bit sequence generates a payload of the first signaling by adding padding bits, and a sum of the first payload size and a number of padding bits comprised in a payload of the first signaling is equal to the target payload size; when the target payload size is less than the first payload size, the first bit sequence generates a payload of the first signaling through bit truncation, and a number of truncated bits of the first bit sequence is equal to a difference value of the first payload size and the target payload size.

19. The method in a first communication node according to claim 18, wherein when the target payload size is less than the first payload size, the first bit sequence generates a payload of the first signaling after being truncated M bit(s), M1 bit(s) comprised in the M bit(s) belongs (belong) to a first field in the first bit sequence, the first field is used to indicate frequency-domain resources, M being a positive integer, M1 being a positive integer not greater than M.

20. The method in a first communication node according to claim 14, comprising:
operating a first signal;
wherein the first signaling is detected, the first signaling is used to determine time-frequency resources occupied by the first signal, and the operating action is transmitting, or the operating action is receiving.

* * * * *